United States Patent [19]

Barnes et al.

[11] 4,359,286
[45] Nov. 16, 1982

[54] CHARACTER SET EXPANSION

[75] Inventors: Johnny G. Barnes; Paul D. Waldo, both of Austin, Tex.

[73] Assignee: International Business Machines Corporation, Armonk, N.Y.

[21] Appl. No.: 208,748

[22] Filed: Nov. 20, 1980

[51] Int. Cl.³ ............................ B41J 5/30; G06K 9/70
[52] U.S. Cl. ........................................ 400/70; 400/76; 400/109; 400/171; 340/146.3 FT; 340/735; 364/419; 364/519; 364/900
[58] Field of Search ................. 400/70, 109, 110, 171, 400/668; 340/146.3 FT, 146.3 A, 365 R, 365 S, 735; 364/200 MS File, 900 MS File, 400, 419, 518, 519, 523

[56] References Cited

U.S. PATENT DOCUMENTS

| | | | |
|---|---|---|---|
| 3,546,681 | 12/1970 | Korn et al. | 340/735 X |
| 3,711,849 | 1/1973 | Hasenbalg | 340/735 X |
| 3,729,730 | 4/1973 | Sevilla et al. | 340/735 X |
| 3,964,591 | 6/1976 | Hill et al. | 340/146.3 FT |
| 4,005,390 | 1/1977 | Findley | 400/70 X |
| 4,026,403 | 5/1977 | Inose et al. | 400/171 X |
| 4,029,947 | 6/1977 | Evans et al. | 364/523 X |
| 4,193,119 | 3/1980 | Arase et al. | 364/900 |
| 4,205,922 | 6/1980 | Pascoe | 400/171 |
| 4,220,417 | 9/1980 | Sprott et al. | 400/70 |
| 4,228,507 | 10/1980 | Leban | 364/419 |
| 4,251,871 | 2/1981 | Yu | 364/518 |
| 4,261,039 | 4/1981 | Baker et al. | 400/70 X |
| 4,262,338 | 4/1981 | Gaudio, Jr. | 364/900 |
| 4,274,079 | 6/1981 | Todd et al. | 340/146.3 FT |
| 4,286,329 | 8/1981 | Goertzel et al. | 364/900 |
| 4,298,945 | 11/1981 | Kyte et al. | 364/523 |
| 4,298,957 | 11/1981 | Duvall et al. | 364/900 |
| 4,300,206 | 11/1981 | Belleson et al. | 364/900 |

OTHER PUBLICATIONS

Hunt et al., "Composing Systems Which Incorporate Font Changing & Impression Setting", IBM Tech. Disclosure Bulletin, vol. 13, No. 5, 10/70, pp. 1149-1150.
Norton et al., "Program for Detecting a Font Change in a Stream of Text Characters", IBM Tech. Discl. Bulletin, vol. 13, No. 8, 1-71, pp. 2270-2271.
Mayo, "Print Element Character Set Status Logic", IBM Tech. Discl. Bulletin, vol. 16, No. 6, Nov. 1973, pp. 1937-1938.

*Primary Examiner*—E. H. Eickholt
*Attorney, Agent, or Firm*—James H. Barksdale, Jr.

[57] ABSTRACT

A method of, and system for, increasing the number of characters available to be printed with a single print element. If a printer is printing from storage and the character being presented to the printer does not match the print element in use, a determination is made as to whether the character is in fact available on the element. If so, the character is caused to be printed. If not, a determination is made as to whether the presented character can be constructed from characters existing on the print element. If so, construction is caused to occur to avoid a print element change. If, however, the presented character does not exist on the print element and cannot be constructed from characters that do exist on the print element, a requirement for a print element change is signalled. Following a change, printing will continue with the new print element as long as characters are available, or can be constructed from available characters. As such, throughput is improved and required operator attention is diminished.

8 Claims, 15 Drawing Figures

OUTPUT TO PRINTER REORDERING PROCESS

OUTPUT TO PRINTER REORDERING PROCESS

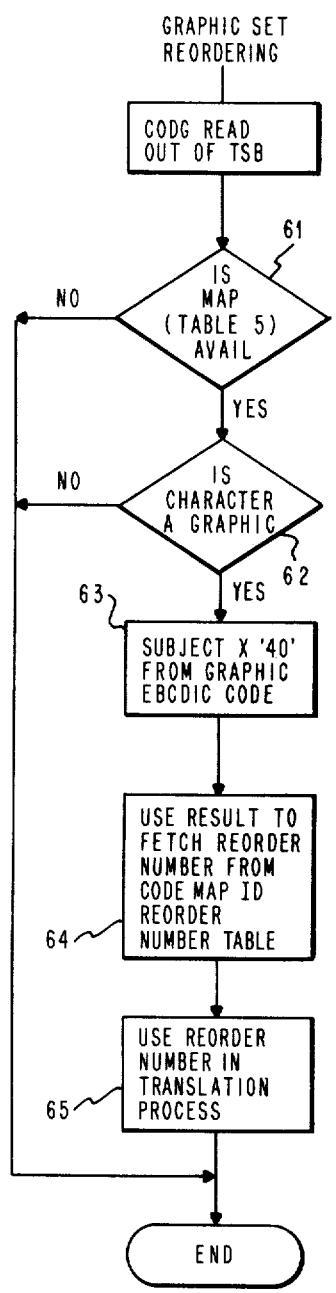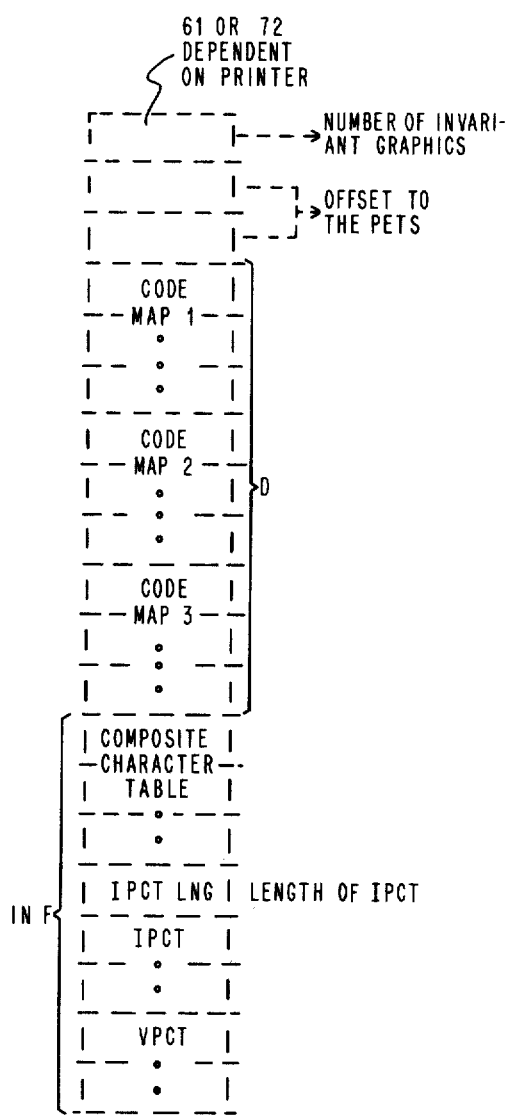
FIG. 4
FIG. 5

CODE MAP, IPCT, VPCT, PET AND CCT STRUCTURE AND LINKAGE

INPUT REORDERING PROCESS

CHARACTER SET EXPANSION

DESCRIPTION

BACKGROUND OF THE INVENTION

1. Field of the Invention

This invention generally relates to handling differing print element requirements. More specifically, this invention relates to expanding the usefulness of print elements in order to reduce print element change requirements and increase throughput.

2. Description of the Prior Art

With the advent of electronic keyboards in word processing systems, the ability to efficiently change keyboard coding to accommodate different print elements has been improved. Mechanical type changes are no longer required. An operator can now change from, for example, English keyboard coding to German keyboard coding by simply keying a keyboard coding change to the system.

There are two types of systems which are readily available in the marketplace today. One includes an interactive keyboard and printer, and the other includes an interactive keyboard and display. In the interactive keyboard/printer system, characters are printed as keyed. In both, keyed characters and keyboard coding changes are stored in a text buffer for later printout and control of printout. During printout at any time using prior art systems, a matching of keyboard coding and printer print elements is required to provide intelligible printed text. Such a requirement can result in an excessive number of print element changes. This is particularly the case when printing is to occur from a buffer and sequentially stored English and German columns are to be printed out in a side-by-side format.

In order to more fully appreciate the problems encountered with present day systems, it is to be recalled that each of the characters and/or graphics included on a print element exist at a particular location on the element. For a wide range of characters, the locations are the same on a wide variety of elements. For example, a lower case "a" will exist at the same location on many of the print elements available for a particular system. A change in keyboard coding presents no problem for this character as long as the character exists on the print element being used. On the other hand, there are certain characters which exist at different locations on different print elements. If the keyboard coding does not match the print element being used, a different character than that keyed will be printed, even though the keyed character is available on the element. With the instant invention, there is in essence a recoding to cause the intended character to be printed from the print element. There are other instances where a composite character such as, for example, an overstruck "a" (å) is called for by the keyboard coding. This composite character is not available as a single character on a wide range of elements, but both the overstrike and lower case "a" characters are widely available on many elements. If both are available on the element in use, the character can be constructed according to this invention.

Representative of the closest known prior art related to reducing print element change requirements are U.S. Pat. Nos. 4,026,403 and 4,205,922. In the first mentioned patent, a reduction in print element change requirements is realized in that the most frequently used or needed characters are arranged on a first to be used print element. Using the first element, all characters capable of being printed are printed on a page and then a second print element is required. The second print element is then used to the extent possible to fill in unprinted areas on the page. If the entire page has not been printed, at least a third print element is required.

U.S. Pat. No. 4,205,922 addresses the problem of stored print element change requirements not corresponding to current printer requirements. That is, when text is stored sequentially, but printed out non-sequentially, a stored print element change requirement may not, in fact, require a change in elements. The disclosed system is structured to alert the operator only when changes are actually necessary.

In summary, the above described art is relevant to varying degrees, but falls short of either anticipating or rendering the instant invention obvious. More specifically, the instant invention presents an advance over the prior art in that sequentially called for print element changes are actually required and signalled only when the print element in use does not contain the next character to be printed and the next character to be printed cannot be constructed from the characters existing on the print element in use. Some of the more important advantages of this advance are (1) the flexibility of standard, readily available print elements is improved, and (2) actual print element change requirements are reduced.

SUMMARY OF THE INVENTION

Both a method of, and system for, efficiently managing print element changes are provided in that both character availability and character construction are looked to before alerting an operator of a print element change requirement.

The characters making up the various keyboards available to the system are mapped in a minimum number of keyboard code maps. Existing in various of the maps are characters which are identically coded. In other instances, different coding represents different characters in different maps. Once a keyboard has been selected, the system will select an appropriate keyboard code map to distinguish coding during input keying. Both selections are stored in a buffer such that a keyboard code map identification code and a keyboard identification code properly identify following text codes. Assuming that at a particular point in time printing is from the buffer and the print element in use matches the last read keyboard identification code. Each character code read is reordered to determine whether it falls within either an invariant, variant, or composite character category. Regardless, reading causes a printing of the corresponding character. For a character read following a subsequent different keyboard identification code, the category can become important. If invariant, reordering causes a printing as before. If the character fails within a variant category and exists on the element, a translation operation is necessary. This is to correct for the code read not matching the desired character position on the element. If the character is not available on the element and the character is not a composite character, a change requirement is signalled. If the character falls within a composite category, and the characters required to construct the composite character are available, category determinations are made to determine whether printing will occur from reordering and/or a translation operations. Regardless, printing is caused to occur. If the character cannot be constructed due to the absence of a required character on the print element, a change requirement is signalled.

Under the above, once a print element is in use, printing can continue beyond normal print element limitations, and keyboard coding changes no longer automatically require a change in print elements.

BRIEF DESCRIPTION OF THE DRAWINGS

FIG. 4 is a flow chart illustrating the operations performed by the processor of FIG. 3 under the control of the reordering program or algorithm denoted in FIG. 2.

FIGS. 5-7 illustrate in greater detail the table makeup of the program section of the storage device shown in FIG. 2.

DESCRIPTION OF THE PREFERRED EMBODIMENT

Figure 1:
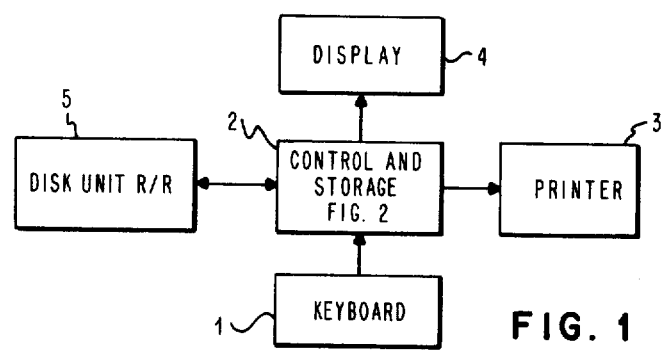
FIG. 1 is a block diagram illustrating, in simplified form, a basic keyboard/display word processing system.

For a more detailed understanding of the invention, reference is made to FIG. 1. In this figure is shown a simplified block diagram illustration of a basic word processing system. The system includes a keyboard 1 having an alpha/numeric section and an outboard section. The alpha/numeric section includes standard keys and bars for characters, numbers, symbols, spaces, carrier returns, case shifts, etc. The outboard section includes keys for cursor control, power on/off, etc. The particular arrangement and inclusion of keys in either section is irrelevant. Of importance is that there are sufficient keys available to (1) support use of a plurality of print elements, and (2) cause a system change upon the keying of a change in keyboard coding.

Keyboard 1 is connected to a control and storage unit 2. In control and storage unit 2 are a storage device including a text storage buffer, and a processor for controlling reading and writing of data out of, and into, the text storage buffer. Further details of the storage device of unit 2 will be set forth later herein when reference is made to FIG. 2. Further details of the processor will be set forth in the following explanation of FIG. 3. For a clearer understanding of the following, it is to be noted that the processor in FIG. 3 is denoted by reference numeral 60. Processor 60 also controls the output of data to a printer 3, a CRT display 4, and a floppy disk reader/recorder 5. The actual control of printer 3, display 4, and reader/recorder 5 forms not part of this invention. Therefore, further discussion is not considered warranted. Processor 60 is under the control of programs read off of a floppy disk into the storage device of control and storage unit 2. As far as this invention is concerned, it is to be assumed that the programs have already been read, and stored in unit 2.

Figure 2:
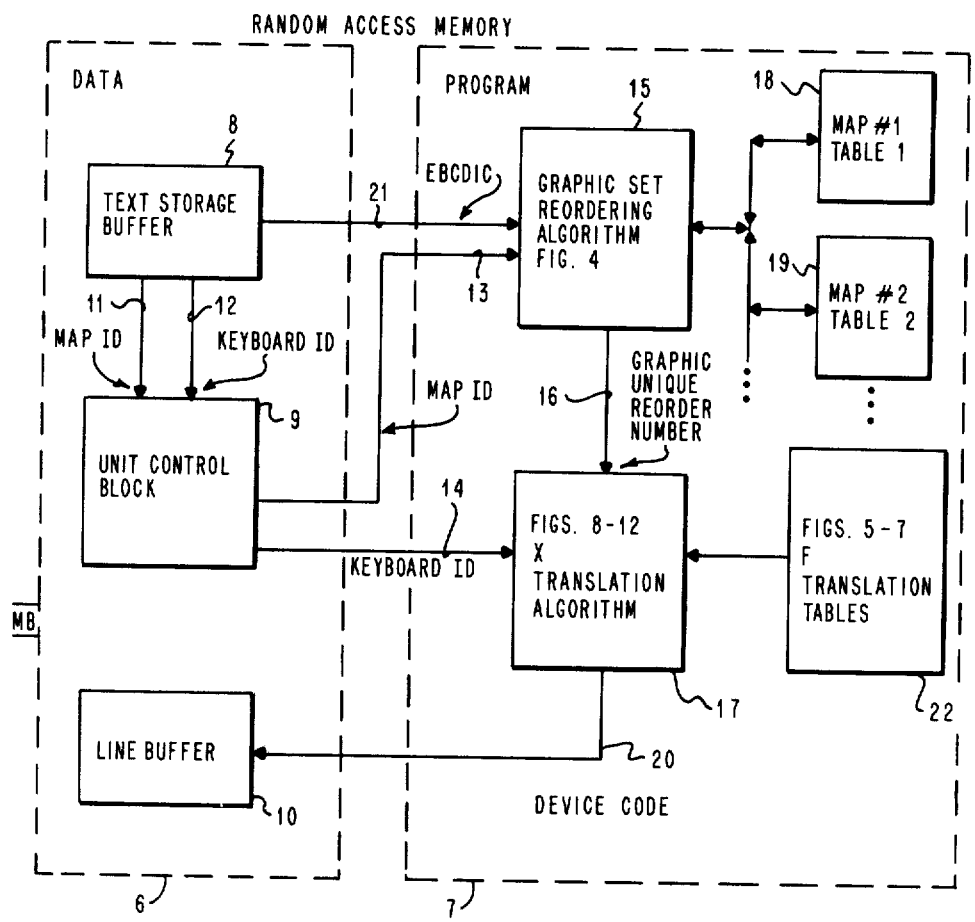
FIG. 2 illustrates in greater detail the makeup of a storage device included in the control and storage block of FIG. 1.
Figure 3:
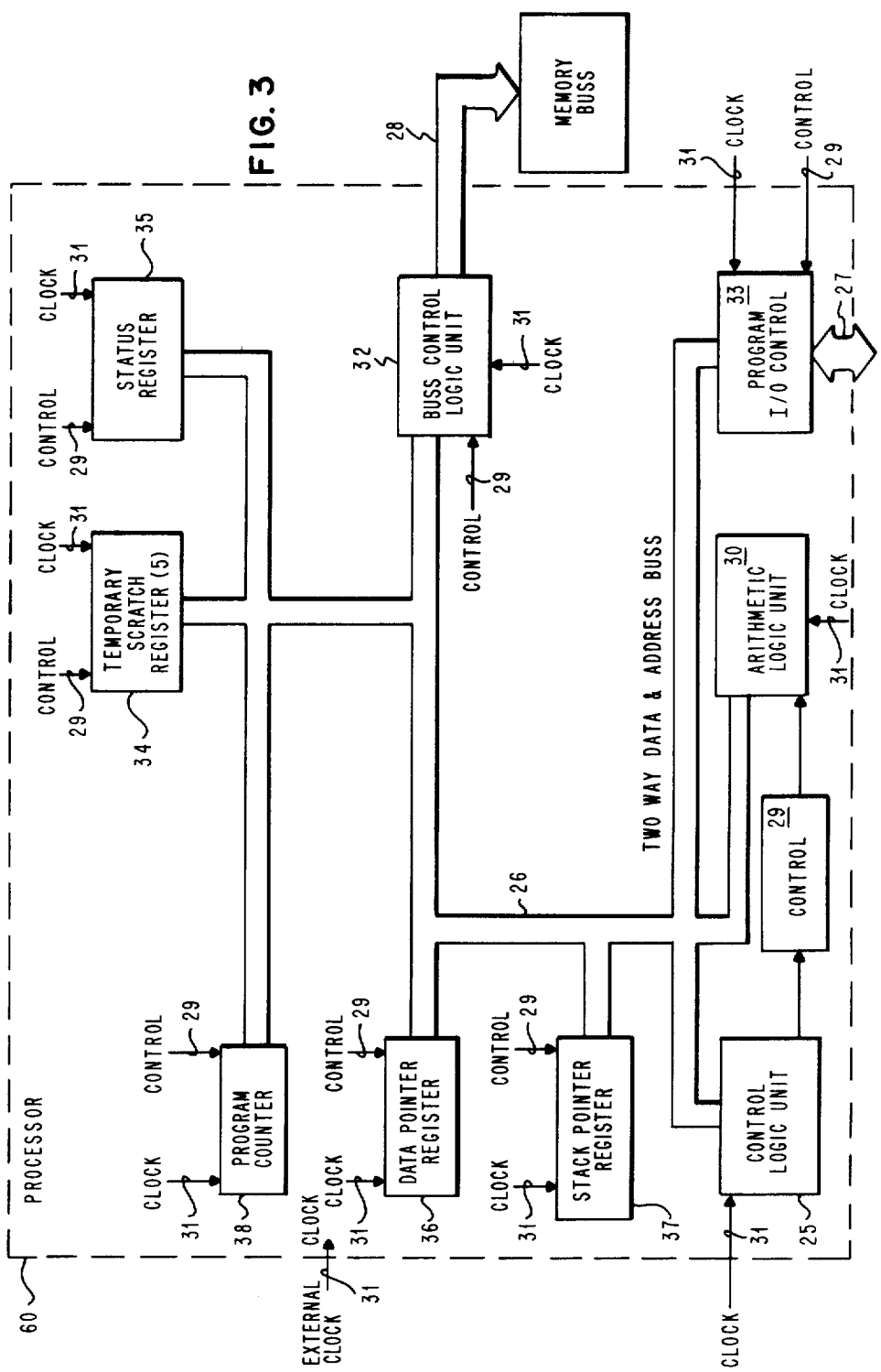
FIG. 3 illustrates in greater detail the makeup of the control section of the control and storage block of FIG. 1.

Refer next to FIG. 2. In this figure is shown a random access memory divided into a data section 6 and a processor section 7. Data section 6 includes a text storage buffer 8, a unit control block 9, and a line buffer 10. For purposes of the following description, it is to be assumed that an operator has keyed and caused the storing of text and appropriate keyboard coding in text storage buffer 8. Also, it is to be assumed that all processor control programming has been stored in section 7, and that the processor will ultimately cause the characters stored in line buffer 10 to be printed. Characters stored in line buffer 10 are to be ultimately printed by printer 3 in FIG. 1 with a proper print element.

To store, format, etc., a line of characters in line buffer 10, processor 60 sequentially reads each character and other code in buffer 8 along line 21. During previous keyboarding, a code was stored for a keyed keyboard identification and following keyed characters. Based on the keyed keyboard identification, a keyboard code map was chosen and an identification code was stored therefor. Upon the reading of keyboard and code map identification codes for a printing operation, outputs are applied along lines 12 and 11, respectively, to unit control block 9. During the reading of characters in buffer 8, processor 60 causes a graphic set reordering operation under the control of a program denoted by block 15. This reordering will be further described when reference is made to FIG. 4. Keyboard and code map identification outputs from control block 9 are along lines 13 and 14 when needed by processor 60. Control block 9 can simply be a storage device which is sampled on an as needed basis. Following a graphic set reordering, a reorder number is applied along line 16 for any needed translation operation by processor 60 under the control of a program denoted by block 17. The translation operation will be further described when reference is made to FIGS. 8-12. For now, a translation operation is meant to include matching a character on a print element in use with the character stored in buffer 8. A number of situations and circumstances arise which require a translation operation. One is that the coding required to drive the printer in use differs from the coding in buffer 8. Another is that, under the same situation as the first, keyboard coding for the characters in buffer 8 does not match the print element in use. These and other situations and circumstances will be more fully appreciated upon a reading of the remainder of the specification.

During a reordering operation, code maps such as 18, 19, etc., which are set out later herein as tables 5, 6, and 7 are indexed. Table structure utilized during the translation operation, and represented by block 22, set out in FIGS. 5-7. These figures will be described in greater detail later herein.

Following a reading of a character in buffer 8, a reordering operation will be performed dependent upon the keyboard coding, and any necessary translation operation will be performed to ultimately provide a code or group of codes along line 20 capable of being utilized by the printer in use. Codes that are output along line 20 are stored, formatted, etc., in line buffer 10. The actual storage, formatting, etc., forms no part of this invention.

Refer next to FIG. 3. In this figure are shown the details of processor 60 which is capable of performing the operations of this invention under program control.

In practice, processor 60 includes an INTEL ® 8086 Microcomputer chip. Typical logic hardware elements forming processor 60 include a control logic unit 25 which responds to instructions from the random access memory of FIG. 2 applied along bus 28. The control logic unit 25 is also in the data stream identified by the data and address bus 26 interconnected to various other logic units of processor 60.

In response to instructions from section 7, control logic unit 25 generates control signals to other logic elements of processor 60. These control signals are interconnected to the various elements by means of a control line 29 which is illustrated directly connected to an arithmetic logic unit 30 and identified as a "control" line 29 to other elements of processor 60. Synchronous operations of the control unit 25 with other logic elements of processor 60 is achieved by means of clock pulses input to processor 60 from an external clock source on bus 31. This bus is also shown interconnected to various other logic elements of processor 60. In addition, bus 31 is connected to reader/recorder 5, display 4, and the memory shown in FIG. 2.

Data to be processed in processor 60 is input either through a bus control logic unit 32 or a program input/output control logic unit 33. The bus control logic 32 connects to the random access memory of FIG. 2 and receives instructions for processing data input to input/output control 33. Thus, input/output control 33 receives data from keyboard 1 while bus control logic 32 receives instructions from the random access memory. Note that different storage sections of the random access memory are identifiable for instruction storage and data storage. Device controls from processor 60 are output through program input/output controller 33 over a data bus 27.

Input data on the data bus 28 is passed internally through processor 60 on the bus 26 to control unit 25. Arithmetic logic unit 30, in response to a control signal on line 29 and in accordance with instructions received on memory bus 28, performs arithmetic computations which may be stored in temporary scratch registers 34. Various other transfers of data between the arithmetic logic unit 30 and other logic elements of processor 60 are, of course, possible. Such additional transfers may be to a status register 35, data pointer register 36 or a stack pointer register 37. Also in the data stream for these various logic elements by means of the bus 26 is a program counter 38.

A particular operating sequence for processor 60 is determined by instructions on the memory bus 28 and input data on the bus 28, or bus 27 from keyboard 1. As an example, in response to received instructions, processor 60 transfers data stored in scratch registers 34 to one of registers 36, 37, or 35. Such operations of a processor as detailed in FIG. 3 are considered to be well known and understood by one of ordinary skill in the data processing field. A detailed description of each of the operations of the processor of FIG. 3 for the described invention would be counterproductive to an understanding of the invention as claimed.

Set out below are three EBCDIC (Extended Binary Coded Decimal Interchange Code) maps which are designated Table 1, Table 2, Table 3. In each of these tables, the first four columns are made up of control codes and can be ignored as far as this invention is concerned. With the first four columns being ignored, the first character of concern is a space (SP) which is in a position defined as hexadecimal 40 (X'40').

Table I

| Column | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Bit → | 00 | | | | 01 | | | | 10 | | | | 11 | | | |
| Bit Pat. ↓ | 00 | 01 | 10 | 11 | 00 | 01 | 10 | 11 | 00 | 01 | 10 | 11 | 00 | 01 | 10 | 11 |
| 0 0000 | | | | | SP | & | − | ø | Ø | ° | µ | ¢ | { | } | \ | 0 |
| 1 0001 | | | | | RSP | é | / | É | a | j | ~ | £ | A | J | NSP | 1 |
| 2 0010 | | | | | â | ê | Â | Ê | b | k | s | ¥ | B | K | S | 2 |
| 3 0011 | | | | | ä | ë | Ä | Ë | c | l | t | Pts | C | L | T | 3 |
| 4 0100 | | | | | à | è | À | È | d | m | u | f | D | M | U | 4 |
| 5 0101 | | | | | á | í | Á | Í | e | n | v | § | E | N | V | 5 |
| 6 0110 | | | | | ã | î | Ã | Î | f | o | w | ¶ | F | O | W | 6 |
| 7 0111 | | | | | å | ï | Å | Ï | g | p | x | ¼ | G | P | X | 7 |
| 8 1000 | | | | | ç | ì | Ç | Ì | h | q | y | ½ | H | Q | Y | 8 |
| 9 1001 | | | | | ñ | ß | Ñ | ` | i | r | z | ¾ | I | R | Z | 9 |
| A 1010 | | | | | [ | ] | ¦ | : | << | ª | ¡ | ¯ | SHY | 1 | 2 | 3 |
| B 1011 | | | | | . | $ | , | # | >> | º | ¿ | \| | ô | û | ò | ù |
| C 1100 | | | | | < | * | % | @ | ð | æ | Ð | − | ö | ü | ó | ü |
| D 1101 | | | | | ( | ) | _ | ' | ý | , | Ý | ¨ | ò | ù | ó | ú |
| E 1110 | | | | | + | ; | > | = | þ | æ | þ | ´ | ó | û | ó | ú |
| F 1111 | | | | | ! | ^ | ? | " | ± | Þ | ® | = | ò | ÿ | ó | EO |

Table II

Table III

Since X'40' is the first usable character, this value will be used as a basis in assigning reorder numbers to the other available characters. As a matter of basic background, which will become pertinent later herein, X'40' is represented in binary form as 01000000. In decimal or base 10, X'40' is equal to 64.

Referring specifically to Table 1, it will be noted that the characters encompassed between X'40' and X'FF' are substantially universal. That is, the majority of characters required for printing in the English, Spanish, German, and French languages are encompassed in Table 1. Also, there are certain characters which are common to all tables and are assigned the same value. For example, refer to the small "a". This character or graphic is in position X'81' in all tables. The small "a" is assigned to an invariant category as will be explained later herein. At the same time, there are other characters, such as a beta symbol, located at position X'59' in Tables 1 and 2, but not existing in Table 3. As such, beta is assigned to If operation is not in Table 1 and "φ" is called for and does not exist on the print element being used, construction is required if printing is to take place at all. Referring to Table 2, a "/" is located at position X'61' and a capital "O" is located at X'D6'. In view of the above, "φ" is assigned to a composite category.

With the above in mind, reference is next made to the following Table 4.

```
                FEEDER NUMBER ASSIGNMENTS
    REORDER NUMBER    |        GRAPHIC
         0            |     A SMALL
         1            |     E SMALL
         2            |     C SMALL
         3            |     D SMALL
         4            |     F SMALL
         5            |     P SMALL
         6            |     G SMALL
         7            |     H SMALL
         8            |     I SMALL
         9            |     J SMALL
        10            |     K SMALL
        11            |     L SMALL
        12            |     M SMALL
        13            |     N SMALL
        14            |     C SMALL
        15            |     P SMALL
        16            |     Q SMALL
        17            |     R SMALL
        18            |     S SMALL
        19            |     T SMALL
        20            |     U SMALL
        21            |     V SMALL
        22            |     W SMALL
        23            |     X SMALL
        24            |     Y SMALL
        25            |     Z SMALL
        26            |     A CAP
        27            |     B CAP
        28            |     C CAP
        29            |     D CAP
        30            |     E CAP
        31            |     F CAP
        32            |     G CAP
        33            |     H CAP
        34            |     I CAP
        35            |     J CAP
        36            |     K CAP
        37            |     L CAP
        38            |     M CAP
        39            |     N CAP
        40            |     O CAP
        41            |     P CAP
        42            |     Q CAP
        43            |     R CAP
        44            |     S CAP
        45            |     T CAP
```

| REORDER NUMBER ASSIGNMENTS ||
|---|---|
| REORDER NUMBER | GRAPHIC |
| 46 | U CAP |
| 47 | V CAP |
| 48 | W CAP |
| 49 | X CAP |
| 50 | Y CAP |
| 51 | Z CAP |
| 52 | REQ. HYPHEN |
| 53 | UNDERSCORE |
| 54 | COMMA |
| 55 | ZERO |
| 56 | ONE |
| 57 | TWO |
| 58 | THREE |
| 59 | FOUR |
| 60 | FIVE |
| 61 | SIX |
| 62 | SEVEN |
| 63 | EIGHT |
| 64 | NINE |
| 65 | PERIOD |
| 66 | SLASH |
| 67 | CLOSE PAREN. |
| 68 | PERCENT SIGN |
| 69 | QUESTION MARK |
| 70 | COLON |
| 71 | OPEN PAREN. |
| 72 | PLUS SIGN |
| 73 | EQUAL SIGN |
| 74 | SPACE |
| 75 | REQ. SPACE |
| 76 | ASTERISK |
| 77 | OPEN BRACKET |
| 78 | CIRCUMFLEX ACC. |
| 79 | GRAVE ACCENT |
| 80 | DEGREE/OVERCIR. |
| 81 | CEDILLA ACCENT |
| 82 | TILDE ACCENT |
| 83 | DIAERESIS, UMLAUT, TREMA |
| 84 | ACUTE ACCENT |
| 85 | CARON ACCENT |
| 86 | OVERDOT ACCENT |
| 87 | APOSTROPHE |
| 88 | DOLLAR SIGN |
| 89 | QUOTATION MARK |
| 90 | VERTICAL LINE |
| 91 | LESS THAN SIGN |

| REORDER NUMBER ASSIGNMENTS | |
|---|---|
| REORDER NUMBER | GRAPHIC |
| 92 | INT. CURRENCY |
| 93 | GREATER THAN |
| 94 | D STROKE, CAP |
| 95 | CENT SIGN |
| 96 | SECTION SIGN |
| 97 | AMPERSAND |
| 98 | CLOSE BRACKET |
| 99 | OPENING BRACE |
| 100 | SYLLABLE HYPHEN |
| 101 | CLOSING BRACE |
| 102 | I DOTLESS, SMALL |
| 103 | REVERSE SLASH |
| 104 | NUMERIC SPACE |
| 105 | TWO, SUPERSCRIPT |
| 106 | THREE, SUPERSCRIPT |
| 107 | EIGHT ONES |
| 108 | SHARP S |
| 109 | OPEN QUOTE, EUR. |
| 110 | CLOSE QUOTE, EUR. |
| 111 | D, ICELANDIC, SMALL |
| 112 | THORN, SMALL |
| 113 | PLUS MINUS SIGN |
| 114 | A UNDERSCORE, SMALL |
| 115 | O UNDERSCORE, SMALL |
| 116 | AE DIPTHONG, SMALL |
| 117 | AE DIPTHONG, CAP |
| 118 | MICRO, MU |
| 119 | SPANISH OPEN EXCLAMATION PT |
| 120 | SPANISH OPEN QUESTION MARK |
| 121 | THORN, CAP |
| 122 | CIRCLE R |
| 123 | PESETA |
| 124 | FLORIN, GUILDER |
| 125 | PARAGRAPH SIGN |
| 126 | ONE QUARTER |
| 127 | ONE HALF |
| 128 | THREE QUARTERS |
| 129 | LOGICAL NOT |
| 130 | LOGICAL OR |
| 131 | OVERBAR |
| 132 | DOUBLE UNDERSCORE |
| 133 | A OGONEK, SMALL |
| 134 | E OGONEK, SMALL |
| 135 | A OGONEK, CAP |
| 136 | NUMBER SIGN |
| 137 | E OGONEK, CAP |

| REORDER NUMBER ASSIGNMENTS ||
|---|---|
| REORDER NUMBER | GRAPHIC |
| 138 | L APOSTROPHE, SMALL |
| 139 | D STROKE, SMALL |
| 140 | L APOSTROPHE, CAP |
| 141 | AT SIGN |
| 142 | T APOSTROPHE, SMALL |
| 143 | O DOUBLE ACUTE, SMALL |
| 144 | U DOUBLE ACUTE, SMALL |
| 145 | T APOSTROPHE, CAP |
| 146 | O DOUBLE ACUTE, CAP |
| 147 | U DOUBLE ACUTE, CAP |
| 148 | A BREVE, SMALL |
| 149 | G BREVE, SMALL |
| 150 | A BREVE, CAP |
| 151 | G BREVE, CAP |
| 152 | DIVIDE SIGN |
| 153 | LITER |
| 154 | APOSTROPHE N, SMALL |
| 155 | A CIRCUMFLEX, SMALL |
| 156 | A DIAERESIS, SMALL |
| 157 | A GRAVE, SMALL |
| 158 | A ACUTE, SMALL |
| 159 | A TILDE, SMALL |
| 160 | A OVERCIRCLE, SMALL |
| 161 | C CEDILLA, SMALL |
| 162 | N TILDE, SMALL |
| 163 | EXCLAMATION POINT |
| 164 | E ACUTE, SMALL |
| 165 | E CIRCUMFLEX, SMALL |
| 166 | E DIAERESIS, SMALL |
| 167 | E GRAVE, SMALL |
| 168 | I ACUTE, SMALL |
| 169 | I CIRCUMFLEX, SMALL |
| 170 | I DIAERESIS, SMALL |
| 171 | I GRAVE, SMALL |
| 172 | SEMICOLON |
| 173 | A CIRCUMFLEX, CAP |
| 174 | A DIAERESIS, CAP |
| 175 | A GRAVE, CAP |
| 176 | A ACUTE, CAP |
| 177 | A TILDE, CAP |
| 178 | A OVERCIRCLE, CAP |
| 179 | C CEDILLA, CAP |
| 180 | N TILDE, CAP |
| 181 | C SLASH, SMALL |
| 182 | E ACUTE, CAP |
| 183 | E CIRCUMFLEX, CAP |

| REORDER NUMBER ASSIGNMENTS | |
|---|---|
| REORDER NUMBER | GRAPHIC |
| 184 | E DIAERESIS, CAP |
| 185 | E GRAVE, CAP |
| 186 | I ACUTE, CAP |
| 187 | I CIRCUMFLEX, CAP |
| 188 | I DIAERESIS, CAP |
| 189 | I GRAVE, CAP |
| 190 | O SLASH, CAP |
| 191 | Y ACUTE, SMALL |
| 192 | Y ACUTE, CAP |
| 193 | POUND SIGN, LIRA |
| 194 | YEN SIGN |
| 195 | O CIRCUMFLEX, SMALL |
| 196 | O DIAERESIS, SMALL |
| 197 | O GRAVE, SMALL |
| 198 | O ACUTE, SMALL |
| 199 | O TILDE, SMALL |
| 200 | U CIRCUMFLEX, SMALL |
| 201 | U DIAERESIS, SMALL |
| 202 | U GRAVE, SMALL |
| 203 | U ACUTE, SMALL |
| 204 | Y DIAERESIS, SMALL |
| 205 | O CIRCUMFLEX, CAP |
| 206 | O DIAERESIS, CAP |
| 207 | O GRAVE, CAP |
| 208 | O ACUTE, CAP |
| 209 | O TILDE, CAP |
| 210 | U CIRCUMFLEX, CAP |
| 211 | U DIAERESIS, CAP |
| 212 | U GRAVE, CAP |
| 213 | U ACUTE, CAP |
| 214 | E CARON, SMALL |
| 215 | C CARON, SMALL |
| 216 | C ACUTE, SMALL |
| 217 | U OVERCIRCLE, SMALL |
| 218 | D CARON, SMALL |
| 219 | L CARON, SMALL |
| 220 | L ACUTE, SMALL |
| 221 | E CARON, CAP |
| 222 | C CARON, CAP |
| 223 | C ACUTE, CAP |
| 224 | U OVERCIRCLE, CAP |
| 225 | D CARON, CAP |
| 226 | L CARON, CAP |
| 227 | L ACUTE, CAP |
| 228 | N CARON, SMALL |
| 229 | R CARON, SMALL |

| REORDER NUMBER ASSIGNMENTS ||
|---|---|
| REORDER NUMBER | GRAPHIC |
| 230 | S ACUTE, SMALL |
| 231 | L STECKE, SMALL |
| 232 | N ACUTE, SMALL |
| 233 | S CARON, SMALL |
| 234 | N CARON, CAP |
| 235 | P CARON, CAP |
| 236 | S ACUTE, CAP |
| 237 | Z OVERDOT, SMALL |
| 238 | Z OVERDOT, CAP |
| 239 | Z CARON, SMALL |
| 240 | Z ACUTE, SMALL |
| 241 | Z CARON, CAP |
| 242 | Z ACUTE, CAP |
| 243 | L STECKE, CAP |
| 244 | N ACUTE, CAP |
| 245 | S CARON, CAP |
| 246 | R ACUTE, SMALL |
| 247 | T CARON, SMALL |
| 248 | R ACUTE, SMALL |
| 249 | T CARON, CAP |
| 250 | I OVERDOT, CAP |
| 251 | S SEDILLA, SMALL |
| 252 | S SEDILLA, CAP |
| 253 | T SEDILLA, SMALL |
| 254 | T SEDILLA, CAP |
| 255 | UNDEFINED CODE POINT |

In Table 4, each of the characters are ordered and assigned a value according to their frequency of use. For example, a small "a" is the most frequently used character and is assigned a decimal value of zero. This zero value is a reorder number which will be used as later described herein to either index a printer code for driving a golf ball printer or gate a code to an EBCDIC driven printer.

Diverting for a moment, additional background information is deemed in order. For the word processing system contemplated herein, the output coding of keyboard 1 will be EBCDIC, storage in buffer 8 will be in EBCDIC, and the coding in line buffer 10 will vary according to the printer being used. Certain printers can be driven directly with EBCDIC, while others such as the single element (golf ball) IBM "Selectric" ® printers are driven with multibit codes which are transformed into tilt and rotate requirements. A printer which can be driven from EBCDIC is the daisy wheel 60 cps, IBM 5218 Printer. This invention is applicable to both types of printers in reducing the number of required print element changes.

Not only are the reorder numbers assigned on frequency of use basis, the category of the character or graphic is identified by the reorder number in an ordered manner. As was pointed out earlier, the categories are invariant, variant, and composite. The categories themselves vary according to the graphic set being used. For example, for the IBM "Selectric" printer 88 character graphic set, the invariant graphic reorder numbers range from 0–61. The variant graphic reorder numbers range from 62–154, and the composite reorder numbers range from 155–255. For the IBM 5218 printer 96 character graphic set, the invariant reorder numbers will range from 0–72, the variant graphic numbers will range from 73–154, and the composite reorder numbers will range from 155–255.

Assume that a printing operation has been initiated by an operator and coding for an English U.S. print element is read in the data stream in buffer 8. It is to be recalled that Table 1 is substantially universal. Based on the print element identification, code map #1 (denoted by reference numeral 18 in FIG. 2), is used which corresponds to Table 1, is selected. If the following character code is 10000001, this binary coding is equal to X'81'. Thereafter, subtracted from the X'81' is X'40', leaving X'41'. X'41', equal to decimal 65, for indexing to a position in code map #1. code map #1 is detailed in Table 5 below. Code map #'s 2 and 3 are set out in Tables 6 and 7 below, and correspond respectively to Tables 2 and 3. Indexing down Table 5 to position 65, it will be seen that the character or graphic is a small "a".

| CODE MAP 1 | |
|---|---|
| 074 | SPACE |
| 075 | REQUIRED SPACE |
| 155 | A CIRCUMFLEX, SMALL |
| 156 | A DIAERESIS, SMALL |
| 157 | A GRAVE, SMALL |
| 158 | A ACUTE, SMALL |
| 159 | A TILDE, SMALL |
| 160 | A OVERCIRCLE SMALL |
| 161 | C CEDILLA, SMALL |
| 162 | N TILDE, SMALL |
| 077 | OPENING BRACKET |
| 065 | PERIOD |
| 091 | LESS THAN SIGN |
| 071 | OPENING PARENTHESIS |
| 072 | PLUS SIGN |
| 163 | EXCLAMATION POINT |
| 097 | AMPERSAND |
| 164 | E ACUTE, SMALL |
| 165 | E CIRCUMFLEX, SMALL |
| 166 | E DIAERESIS, SMALL |
| 167 | E GRAVE, SMALL |
| 168 | I ACUTE, SMALL |
| 169 | I CIRCUMFLEX, SMALL |
| 170 | I DIAERESIS, SMALL |
| 171 | I GRAVE, SMALL |
| 108 | SHARP S |
| 098 | CLOSING BRACKET |
| 088 | DOLLAR SIGN |
| 076 | ASTERISK |
| 067 | CLOSING PARENTHESIS |
| 172 | SEMICOLON |
| 078 | CIRCUMFLEX ACCENT |
| 052 | MINUS SIGN, HYPHEN |
| 066 | SLASH |
| 173 | A CIRCUMFLEX, CAP |
| 174 | A DIAERESIS, CAP |
| 175 | A GRAVE, CAP |
| 176 | A ACUTE, CAP |
| 177 | A TILDE, CAP |
| 178 | A OVERCIRCLE, CAP |
| 179 | C CEDILLA, CAP |
| 180 | N TILDE, CAP |
| 090 | VERTICAL LINE |
| 054 | COMMA |
| 068 | PERCENT SIGN |
| 053 | UNDERSCORE |

| CODE MAP 1 | |
|---|---|
| 093 | GREATER THAN SIGN |
| 069 | QUESTION MARK |
| 181 | O SLASH, SMALL |
| 182 | E ACUTE, CAP |
| 183 | E CIRCUMFLEX, CAP |
| 184 | E DIAERESIS, CAP |
| 185 | E GRAVE, CAP |
| 186 | I ACUTE, CAP |
| 187 | I CIRCUMFLEX, CAP |
| 188 | I DIAERESIS, CAP |
| 189 | I GRAVE, CAP |
| 079 | GRAVE ACCENT |
| 070 | COLON |
| 136 | NUMBER SIGN |
| 141 | AT SIGN |
| 087 | APOSTROPHE |
| 073 | EQUAL SIGN |
| 089 | QUOTATION MARK |
| 190 | O SLASH, CAP |
| 000 | A, SMALL  ← 20 ← 65D = 41X |
| 001 | B, SMALL |
| 002 | C, SMALL |
| 003 | D, SMALL |
| 004 | E, SMALL |
| 005 | F, SMALL |
| 006 | G, SMALL |
| 007 | H, SMALL |
| 008 | I, SMALL |
| 109 | OPENING QUOTE, EUROPEAN |
| 110 | CLOSING QUOTE, EUROPEAN |
| 111 | D, ICELANDIC, SMALL |
| 191 | Y ACUTE, SMALL |
| 112 | THORN, SMALL |
| 113 | PLUS MINUS SIGN |
| 080 | DEGREE, OVERCIRCLE |
| 009 | J, SMALL |
| 010 | K, SMALL |
| 011 | L, SMALL |
| 012 | M, SMALL |
| 013 | N, SMALL |
| 014 | O, SMALL |
| 015 | P, SMALL |
| 016 | Q, SMALL |
| 017 | R, SMALL |
| 114 | A UNDERSCORE, SMALL |

| CODE MAP 1 | |
|---|---|
| 115 | O UNDERSCORE, SMALL |
| 116 | AE DIPTHONG, SMALL |
| 081 | CEDILLA |
| 117 | AE DIPTHONG, CAP |
| 092 | INTERNATIONAL CURRENCY SYMBOL |
| 118 | MICRO, MU |
| 082 | TILDE ACCENT |
| 018 | S, SMALL |
| 019 | T, SMALL |
| 020 | U, SMALL |
| 021 | V, SMALL |
| 022 | W, SMALL |
| 023 | X, SMALL |
| 024 | Y, SMALL |
| 025 | Z, SMALL |
| 119 | SPANISH OPENING EXCLAMATION POINT |
| 120 | SPANISH OPENING QUESTION MARK |
| 094 | D STROKE, CAP |
| 192 | Y ACUTE, CAP |
| 121 | THORN, CAP |
| 122 | CIRCLE R |
| 095 | CENT SIGN |
| 193 | POUND SIGN, LIRA |
| 194 | YEN SIGN |
| 123 | PESETA |
| 124 | FLORIN, GUILDER |
| 096 | SECTION SIGN |
| 125 | PARAGRAPH SIGN |
| 126 | ONE QUARTER |
| 127 | ONE HALF |
| 128 | THREE QUARTERS |
| 129 | LOGICAL NOT |
| 130 | LOGICAL OR |
| 131 | OVERBAR |
| 083 | DIAERESIS, UMLAUT, TREMA ACCENT |
| 084 | ACUTE ACCENT |
| 132 | DOUBLE UNDERSCORE |
| 099 | OPENING BRACE |
| 026 | A, CAP |
| 027 | B, CAP |
| 028 | C, CAP |
| 029 | D, CAP |
| 030 | E, CAP |
| 031 | F, CAP |
| 032 | G, CAP |

| CODE MAP 1 | |
|---|---|
| 033 | H, CAP |
| 034 | I, CAP |
| 100 | SYLLABLE HYPHEN |
| 195 | O CIRCUMFLEX, SMALL |
| 196 | O DIAERESIS, SMALL |
| 197 | O GRAVE, SMALL |
| 198 | O ACUTE, SMALL |
| 199 | O TILDE, SMALL |
| 101 | CLOSING BRACE |
| 035 | J, CAP |
| 036 | K, CAP |
| 037 | L, CAP |
| 038 | M, CAP |
| 039 | N, CAP |
| 040 | O, CAP |
| 041 | P, CAP |
| 042 | Q, CAP |
| 043 | R, CAP |
| 102 | I DOTLESS, SMALL |
| 200 | U CIRCUMFLEX, SMALL |
| 201 | U DIAERESIS, SMALL |
| 202 | U GRAVE, SMALL |
| 203 | U ACUTE, SMALL |
| 204 | Y DIAERESIS, SMALL |
| 103 | REVERSE SLASH |
| 104 | NUMERIC SPACE |
| 044 | S, CAP |
| 045 | T, CAP |
| 046 | U, CAP |
| 047 | V, CAP |
| 048 | W, CAP |
| 049 | X, CAP |
| 050 | Y, CAP |
| 051 | Z, CAP |
| 105 | TWO, SUPERSCRIPT |
| 205 | O CIRCUMFLEX, CAP |
| 206 | O DIAERESIS, CAP |
| 207 | O GRAVE, CAP |
| 208 | O ACUTE, CAP |
| 209 | O TILDE, CAP |
| 055 | ZERO |
| 056 | ONE |
| 057 | TWO |
| 058 | THREE |
| 059 | FOUR |

| CODE MAP 1 | |
|---|---|
| 060 | FIVE |
| 061 | SIX |
| 062 | SEVEN |
| 063 | EIGHT |
| 064 | NINE |
| 106 | THREE, SUPERSCRIPT |
| 210 | U CIRCUMFLEX, CAP |
| 211 | U DIAERESIS, CAP |
| 212 | U GRAVE, CAP |
| 213 | U ACUTE, CAP |
| 107 | EIGHT ONES |

| CODE MAP 2 | |
|---|---|
| 074 | SPACE |
| 075 | REQUIRED SPACE |
| 133 | A OGONEK, SMALL |
| 156 | A DIAERESIS, SMALL |
| 157 | A GRAVE, SMALL |
| 158 | A ACUTE, SMALL |
| 214 | E CARON, SMALL |
| 215 | C CARON, SMALL |
| 161 | C CEDILLA, SMALL |
| 216 | C ACUTE, SMALL |
| 077 | OPENING BRACKET |
| 065 | PERIOD |
| 091 | LESS THAN SIGN |
| 071 | OPENING PARENTHESIS |
| 072 | PLUS SIGN |
| 163 | EXCLAMATION POINT |
| 097 | AMPERSAND |
| 164 | E ACUTE, SMALL |
| 134 | E OGONEK, SMALL |
| 166 | E DIAERESIS, SMALL |
| 217 | U OVERCIRCLE, SMALL |
| 168 | I ACUTE, SMALL |
| 218 | D CARON, SMALL |
| 219 | L CARON, SMALL |
| 220 | L ACUTE, SMALL |
| 108 | SHARP S |
| 098 | CLOSING BRACKET |
| 083 | DOLLAR SIGN |
| 076 | ASTERISK |
| 067 | CLOSING PARENTHESIS |
| 172 | SEMICOLON |
| 078 | CIRCUMFLEX ACCENT |
| 052 | MINUS SIGN, HYPHEN |
| 066 | SLASH |
| 135 | A OGONEK, CAP |
| 174 | A DIAERESIS, CAP |
| 175 | A GRAVE, CAP |
| 176 | A ACUTE, CAP |
| 221 | E CARON, CAP |
| 222 | C CARON, CAP |
| 179 | C CEDILLA, CAP |
| 223 | C ACUTE, CAP |
| 090 | VERTICAL LINE |
| 054 | COMMA |
| 068 | PERCENT SIGN |
| 053 | UNDERSCORE |

| CODE MAP 2 | |
|---|---|
| 093 | GREATER THAN SIGN |
| 069 | QUESTION MARK |
| 085 | CARON ACCENT |
| 182 | E ACUTE, CAP |
| 137 | E OGONEK, CAP |
| 184 | E DIAERESIS, CAP |
| 224 | U OVERCIRCLE, CAP |
| 186 | I ACUTE, CAP |
| 225 | D CARON, CAP |
| 226 | L CARON, CAP |
| 227 | L ACUTE, CAP |
| 079 | GRAVE ACCENT |
| 070 | COLON |
| 136 | NUMBER SIGN |
| 141 | AT SIGN |
| 087 | APOSTROPHE |
| 073 | EQUAL SIGN |
| 089 | QUOTATION MARK |
| 255 | DUMMY |
| 000 | A, SMALL |
| 001 | B, SMALL |
| 002 | C, SMALL |
| 003 | D, SMALL |
| 004 | E, SMALL |
| 005 | F, SMALL |
| 006 | G, SMALL |
| 007 | H, SMALL |
| 008 | I, SMALL |
| 138 | I APOSTROPHE, SMALL |
| 228 | N CARON, SMALL |
| 139 | D STROKE, SMALL |
| 191 | Y ACUTE, SMALL |
| 229 | R CARON, SMALL |
| 230 | S ACUTE, SMALL |
| 080 | DEGREE, OVERCIRCLE |
| 009 | J, SMALL |
| 010 | K, SMALL |
| 011 | L, SMALL |
| 012 | M, SMALL |
| 013 | N, SMALL |
| 014 | O, SMALL |
| 015 | P, SMALL |
| 016 | Q, SMALL |
| 017 | R, SMALL |
| 231 | L STROKE, SMALL |
| 232 | N ACUTE, SMALL |

| CODE MAP 2 | |
|---|---|
| 233 | S CARON, SMALL |
| 081 | CEDILLA |
| 255 | DUMMY |
| 092 | INTERNATIONAL CURRENCY SYMBOL |
| 255 | DUMMY |
| 082 | TILDE ACCENT |
| 018 | S, SMALL |
| 019 | T, SMALL |
| 020 | U, SMALL |
| 021 | V, SMALL |
| 022 | W, SMALL |
| 023 | X, SMALL |
| 024 | Y, SMALL |
| 025 | Z, SMALL |
| 140 | L APOSTROPHE, CAP |
| 234 | N CARON, CAP |
| 094 | D STROKE, CAP |
| 192 | Y ACUTE, CAP |
| 235 | R CARON, CAP |
| 236 | S ACUTE, CAP |
| 086 | OVERDOT ACCENT |
| 193 | POUND SIGN, LIRA |
| 237 | Z OVERDOT, SMALL |
| 255 | DUMMY |
| 238 | Z OVERDOT, CAP |
| 096 | SECTION SIGN |
| 239 | Z CARON, SMALL |
| 240 | Z ACUTE, SMALL |
| 241 | Z CARON, CAP |
| 242 | Z ACUTE, CAP |
| 243 | L STROKE, CAP |
| 244 | N ACUTE, CAP |
| 245 | S CARON, CAP |
| 083 | DIAERESIS, UMLAUT, TREMA ACCENT |
| 084 | ACUTE ACCENT |
| 142 | T APOSTROPHE, SMALL |
| 099 | OPENING BRACE |
| 026 | A, CAP |
| 027 | B, CAP |
| 028 | C, CAP |
| 029 | D, CAP |
| 030 | E, CAP |
| 031 | F, CAP |
| 032 | G, CAP |
| 033 | H, CAP |
| 034 | I, CAP |

| CODE MAP 2 | |
|---|---|
| 100 | SYLLABLE HYPHEN |
| 195 | O CIRCUMFLEX, SMALL |
| 196 | O DIAERESIS, SMALL |
| 246 | R ACUTE, SMALL |
| 198 | O ACUTE, SMALL |
| 143 | O DOUBLE ACUTE, SMALL |
| 101 | CLOSING BRACE |
| 035 | J, CAP |
| 036 | K, CAP |
| 037 | L, CAP |
| 038 | M, CAP |
| 039 | N, CAP |
| 040 | O, CAP |
| 041 | P, CAP |
| 042 | Q, CAP |
| 043 | R, CAP |
| 102 | I DOTLESS, SMALL |
| 144 | U DOUBLE ACUTE, SMALL |
| 201 | U DIAERESIS, SMALL |
| 247 | T CARON, SMALL |
| 203 | U ACUTE, SMALL |
| 145 | T APOSTROPHE, CAP |
| 103 | REVERSE SLASH |
| 104 | NUMERIC SPACE |
| 044 | S, CAP |
| 045 | T, CAP |
| 046 | U, CAP |
| 047 | V, CAP |
| 048 | W, CAP |
| 049 | X, CAP |
| 050 | Y, CAP |
| 051 | Z, CAP |
| 105 | TWO, SUPERSCRIPT |
| 205 | O CIRCUMFLEX, CAP |
| 206 | O DIAERESIS, CAP |
| 248 | R ACUTE, CAP |
| 208 | O ACUTE, CAP |
| 146 | O DOUBLE ACUTE, CAP |
| 055 | ZERO |
| 056 | ONE |
| 057 | TWO |
| 058 | THREE |
| 059 | FOUR |
| 060 | FIVE |
| 061 | SIX |
| 062 | SEVEN |

| CODE MAP 2 | |
|---|---|
| 063 | EIGHT |
| 064 | NINE |
| 106 | THREE, SUPERSCRIPT |
| 147 | U DOUBLE ACUTE, CAP |
| 211 | U DIAERESIS, CAP |
| 249 | T CARON, CAP |
| 213 | U ACUTE, CAP |
| 107 | EIGHT ONES |

| | CODE MAP 3 | |
|---|---|---|
| 074 | SPACE | |
| 075 | REQUIRED SPACE | |
| 155 | A CIRCUMFLEX, SMALL | |
| 156 | A DIAERESIS, SMALL | |
| 157 | A GRAVE, SMALL | |
| 158 | A ACUTE, SMALL | |
| 148 | A BREVE, SMALL | |
| 160 | A OVERCIRCLE SMALL | |
| 161 | C CEDILLA, SMALL | |
| 149 | G BREVE, SMALL | |
| 077 | OPENING BRACKET | |
| 065 | PERIOD | |
| 091 | LESS THAN SIGN | |
| 071 | OPENING PARENTHESIS | |
| 072 | PLUS SIGN | |
| 163 | EXCLAMATION POINT | |
| 097 | AMPERSAND | |
| 164 | E ACUTE, SMALL | |
| 165 | E CIRCUMFLEX, SMALL | |
| 166 | E DIAERESIS, SMALL | |
| 167 | E GRAVE, SMALL | |
| 168 | I ACUTE, SMALL | |
| 169 | I CIRCUMFLEX, SMALL | |
| 170 | I DIAERESIS, SMALL | |
| 171 | I GRAVE, SMALL | |
| 250 | I OVERDOT, CAP | |
| 098 | CLOSING BRACKET | |
| 083 | DOLLAR SIGN | |
| 076 | ASTERISK | |
| 067 | CLOSING PARENTHESIS | |
| 172 | SEMICOLON | |
| 078 | CIRCUMFLEX ACCENT | |
| 052 | MINUS SIGN, HYPHEN | |
| 066 | SLASH | |
| 173 | A CIRCUMFLEX, CAP | |
| 174 | A DIAERESIS, CAP | |
| 175 | A GRAVE, CAP | |
| 176 | A ACUTE, CAP | |
| 150 | A BREVE, CAP | |
| 178 | A OVERCIRCLE, CAP | |
| 179 | C CEDILLA, CAP | |
| 151 | G BREVE, CAP | |
| 090 | VERTICAL LINE | |
| 054 | COMMA | |
| 068 | PERCENT SIGN | |
| 053 | UNDERSCORE | |

| CODE MAP 3 | |
|---|---|
| 093 | GREATER THAN SIGN |
| 069 | QUESTION MARK |
| 255 | DUMMY |
| 182 | E ACUTE, CAP |
| 183 | E CIRCUMFLEX, CAP |
| 184 | E DIAERESIS, CAP |
| 185 | E GRAVE, CAP |
| 186 | I ACUTE, CAP |
| 187 | I CIRCUMFLEX, CAP |
| 188 | I DIAERESIS, CAP |
| 189 | I GRAVE, CAP |
| 079 | GRAVE ACCENT |
| 070 | COLON |
| 136 | NUMBER SIGN |
| 141 | AT SIGN |
| 087 | APOSTROPHE |
| 073 | EQUAL SIGN |
| 089 | QUOTATION MARK |
| 255 | DUMMY |
| 000 | A, SMALL |
| 001 | B, SMALL |
| 002 | C, SMALL |
| 003 | D, SMALL |
| 004 | E, SMALL |
| 005 | F, SMALL |
| 006 | G, SMALL |
| 007 | H, SMALL |
| 008 | I, SMALL |
| 255 | DUMMY |
| 255 | DUMMY |
| 139 | D STROKE, SMALL |
| 255 | DUMMY |
| 152 | DIVIDE SIGN |
| 251 | S SEDILA, SMALL |
| 080 | DEGREE, OVERCIRCLE |
| 009 | J, SMALL |
| 010 | K, SMALL |
| 011 | L, SMALL |
| 012 | M, SMALL |
| 013 | N, SMALL |
| 014 | O, SMALL |
| 015 | P, SMALL |
| 016 | Q, SMALL |
| 017 | R, SMALL |
| 255 | DUMMY |

| CODE MAP 3 | |
|---|---|
| 255 | DUMMY |
| 255 | DUMMY |
| 081 | CEDILLA |
| 153 | LITER |
| 092 | INTERNATIONAL CURRENCY SYMBOL |
| 118 | MICRO, MU |
| 082 | TILDE ACCENT |
| 018 | S, SMALL |
| 019 | T, SMALL |
| 020 | U, SMALL |
| 021 | V, SMALL |
| 022 | W, SMALL |
| 023 | X, SMALL |
| 024 | Y, SMALL |
| 025 | Z, SMALL |
| 255 | DUMMY |
| 255 | DUMMY |
| 094 | D STROKE, CAP |
| 255 | DUMMY |
| 154 | APOSTROPHE N, SMALL |
| 252 | S SEDILA, CAP |
| 086 | OVERDOT ACCENT |
| 193 | POUND SIGN, LIRA |
| 255 | DUMMY |
| 255 | DUMMY |
| 255 | DUMMY |
| 096 | SECTION SIGN |
| 255 | DUMMY |
| 255 | DUMMY |
| 127 | ONE HALF |
| 255 | DUMMY |
| 255 | DUMMY |
| 255 | DUMMY |
| 255 | DUMMY |
| 083 | DIAERESIS, UMLAUT, TREMA ACCENT |
| 084 | ACUTE ACCENT |
| 253 | T SEDILA, SMALL |
| 099 | CEDNING ERACE |
| 026 | A, CAP |
| 027 | B, CAP |
| 028 | C, CAP |
| 029 | D, CAP |
| 030 | E, CAP |
| 031 | F, CAP |
| 032 | G, CAP |

| CODE MAP 3 | |
|---|---|
| 033 | H, CAP |
| 034 | I, CAP |
| 100 | SYLLABLE HYPHEN |
| 195 | O CIRCUMFLEX, SMALL |
| 196 | O DIAERESIS, SMALL |
| 197 | O GRAVE, SMALL |
| 198 | O ACUTE, SMALL |
| 255 | DUMMY |
| 101 | CLOSING BRACE |
| 035 | J, CAP |
| 036 | K, CAP |
| 037 | L, CAP |
| 038 | M, CAP |
| 039 | N, CAP |
| 040 | O, CAP |
| 041 | P, CAP |
| 042 | Q, CAP |
| 043 | R, CAP |
| 102 | I DOTLESS, SMALL |
| 200 | U CIRCUMFLEX, SMALL |
| 201 | U DIAERESIS, SMALL |
| 202 | U GRAVE, SMALL |
| 203 | U ACUTE, SMALL |
| 254 | I SEDILA, CAP |
| 103 | REVERSE SLASH |
| 104 | NUMERIC SPACE |
| 044 | S, CAP |
| 045 | T, CAP |
| 046 | U, CAP |
| 047 | V, CAP |
| 048 | W, CAP |
| 049 | X, CAP |
| 050 | Y, CAP |
| 051 | Z, CAP |
| 105 | TWO, SUPERSCRIPT |
| 205 | O CIRCUMFLEX, CAP |
| 206 | O DIAERESIS, CAP |
| 207 | O GRAVE, CAP |
| 208 | O ACUTE, CAP |
| 255 | DUMMY |
| 055 | ZERO |
| 056 | ONE |
| 057 | TWO |
| 058 | THREE |
| 059 | FOUR |
| 060 | FIVE |
| 061 | SIX |
| 062 | SEVEN |
| 063 | EIGHT |
| 064 | NINE |
| 106 | THREE, SUPERSCRIPT |
| 210 | U CIRCUMFLEX, CAP |
| 211 | U DIAERESIS, CAP |
| 212 | U GRAVE, CAP |
| 213 | U ACUTE, CAP |
| 107 | EIGHT ONES |

The reorder number for the small "a" is zero. Identified is the invariant category, and as such the same character will exist in all of code maps 18, 19, etc., and on all the print elements. In the event a golf ball type printer is being utilized, requiring tilt and rotate information, the reorder number of zero is used to index into an invariant printer code table to obtain a code which can be used to meet tilt and rotate requirements in printing a small "a". As has been mentioned, each of the characters are categorized in terms of invariant, variant, and composite.

In the above, the overall reordering operation has been briefly described. In referring to FIG. 4, the reordering operation is set forth in greater detail. When an EBCDIC code is read out of text storage buffer 8 along line 21 to graphic set reordering block 15 in FIG. 2, a test, represented by logic sequence 61, identifies whether the code map read out of the unit control block is available to the graphic set reordering algorithm identified by block 15 in FIG. 2. If not, the reordering sequence is terminated. The code maps available are identified by blocks 18, 19, etc. It is to be assumed that the input to reordering block 15 along line 13 has indicated map number 1 (18 in FIG. 2). The EBCDIC read out of text storage buffer 8 is contained in code map number 1. A test represented by logic sequence 62 is made to determine whether the EBCDIC code is a graphic (character) code. If not, the graphic set reordering operation or sequence is terminated. The reason is that if the code is not a graphic, then it is a control to which the reordering operation is not applicable. If the code read out of the text storage buffer is a graphic code, then a subtraction operation is performed as indicated by logic sequence number 63. Following the subtraction operation, logic sequence 64 causes a conversion of the hexadecimal result to decimal for indexing into Table 5. Following indexing into Table 5 to obtain a reorder number, a translation operation may be in order. If the printer is EBCDIC driven and the reorder number indicates an invariant character, the reorder number serves as a gating term for gating the code for the "a" read out of buffer 8 to buffer 10. If the printer is not EBCDIC driven or the character is variant, a translation operation indicated by logic sequence 65 is performed. Translation logic sequence 65 is more fully described in detail in FIGS. 8-12. Logic sequence 65 and the details set forth in FIGS. 8-12 make up the algorithm of block 17 in FIG. 2. Before addressing block 17 in FIG. 2 and FIGS. 8-12, the structure of the translation tables in block 22 of section 7 will be described. Reference for this description is to FIGS. 5-7.

In FIG. 5 there is shown a storage table having stored therein, beginning at the top, the number of available invariant graphics. This number is dependent upon the printer in use. Next in the table appears an offset to print element tables which will be described with reference to FIG. 6. Thereafter, code maps 1-3 shown in FIG. 2 represented by Tables 5, 6, and 7 appear in the table, followed by a composite character table shown in more detail in FIG. 7. Next is stored a length of the invariant printer table and the invariant printer table shown in FIG. 7, followed by the variant printer code table shown in FIG. 7. The portion of the table shown in FIG. 5 beginning with the composite character table and extending through the variant printer code table is included in block 22 of FIG. 2.

Figure 6:
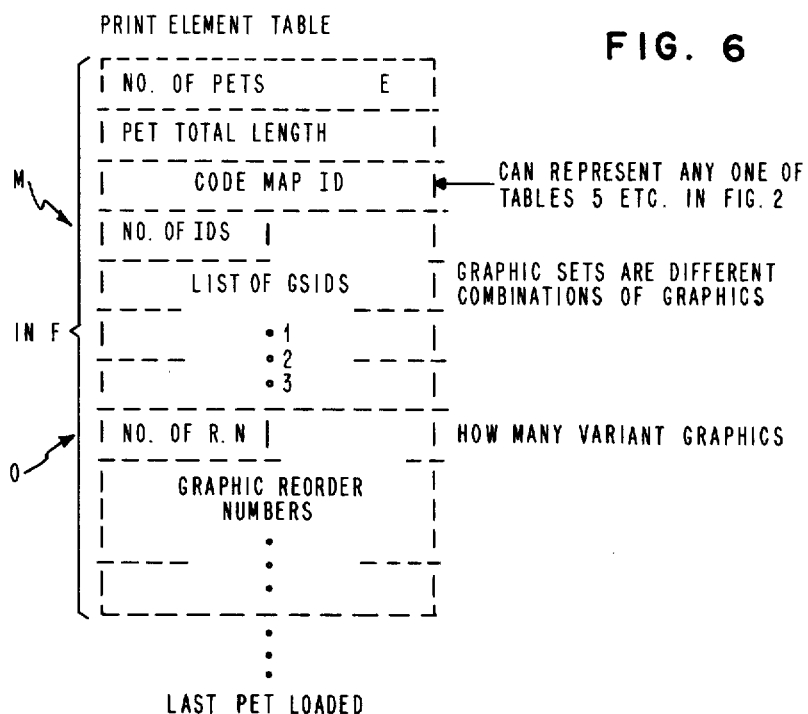
Figure 10:
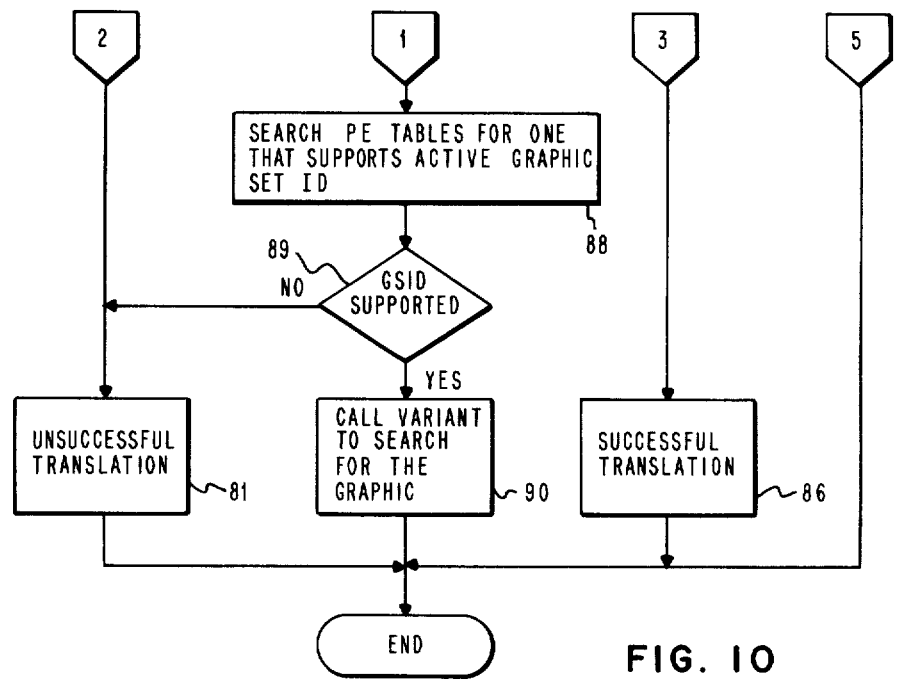
FIGS. 8-12 are flow charts illustrating the operations performed by the processor of FIG. 3 under the control of the translation program or algorithm of FIG. 2.

Refer next to FIG. 6 which illustrates a print element table, an offset to which is referred to in FIG. 5. In FIG. 6, the table is made up, in order, of (1) the number of print element tables illustrated in FIG. 7, (2) the print element table total length, (3) a code map identification code which can represent any one of maps 1-3 in FIG. 2 (Tables 5-7), (4) the number of graphic set identification codes, (5) a list of the graphic set identification codes available for use and supported by a particular print element, (6) the number of reorder numbers, i.e., how many variant graphics, and (7) a listing of the variant graphic reorder numbers. All of the print element table illustrated in FIG. 6 forms part of block 22 in FIG. 2.

Figure 7:
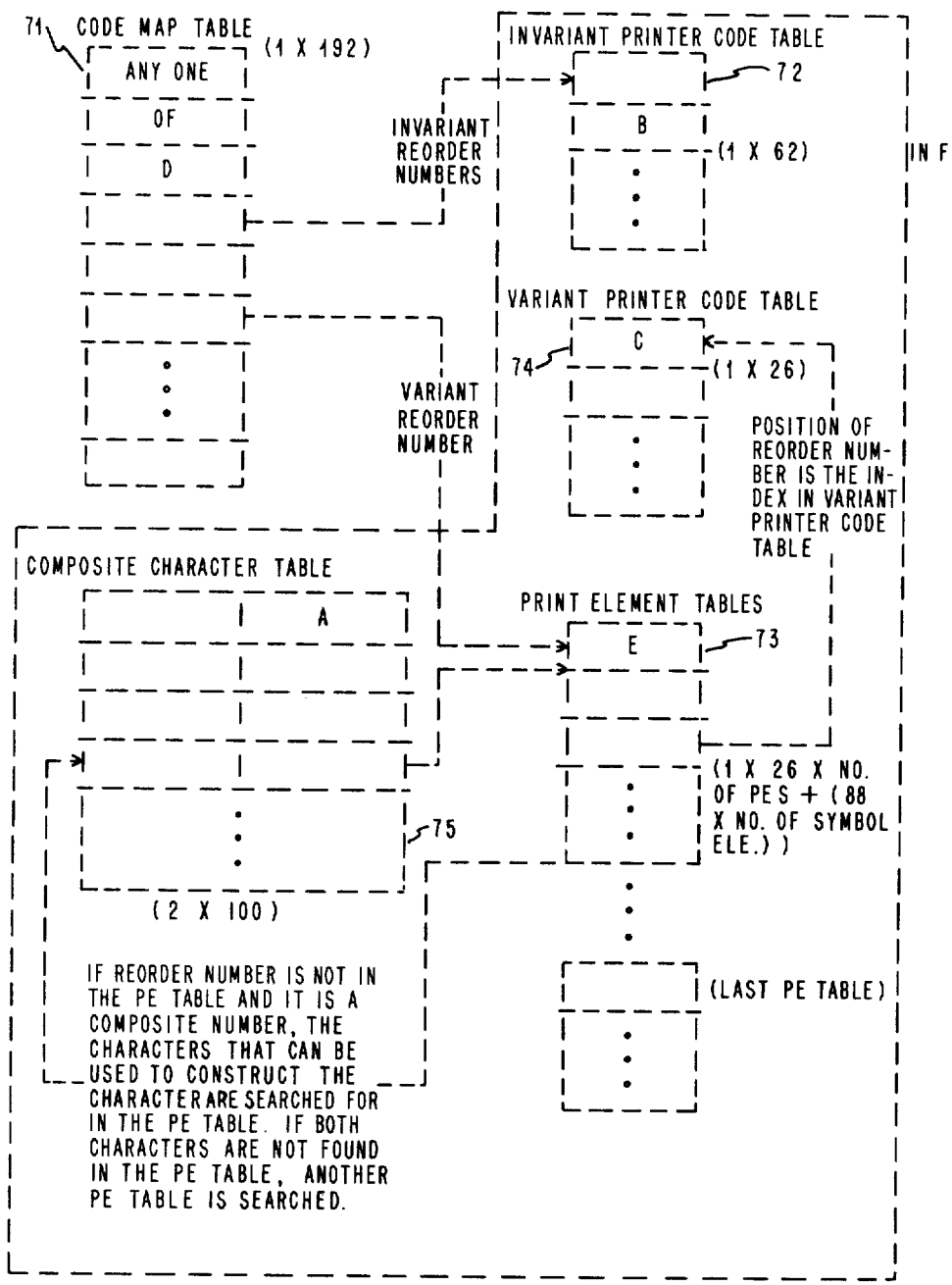

Refer next to FIG. 7. In this figure is illustrated in the upper left hand corner a code map table 71 in which is stored any one of the contents of code maps 1-3. Depending upon which one of code maps 1-3 is stored in code map table 71, and the particular printer in use, pointers will be provided to invariant printer code table 72 and print element tables 73. With the exception of code map table 71, the remainder of FIG. 7 is included in block 22 of FIG. 2. Code map table 71 is included in either block 18, 19, etc., of FIG. 2. If the variant reorder number is found in the print element table, the translation algorithm is pointed to the variant printer code table 74. If it is not found and is a composite reorder number, the translation algorithm is pointed to the composite character table 75 for the reorder numbers of the characters that can be used to construct the character. The reorder numbers from the composite character table point the translation algorithm to the print element table 73 or the print element table 73 and the variant printer code table 72.

Figure 8:
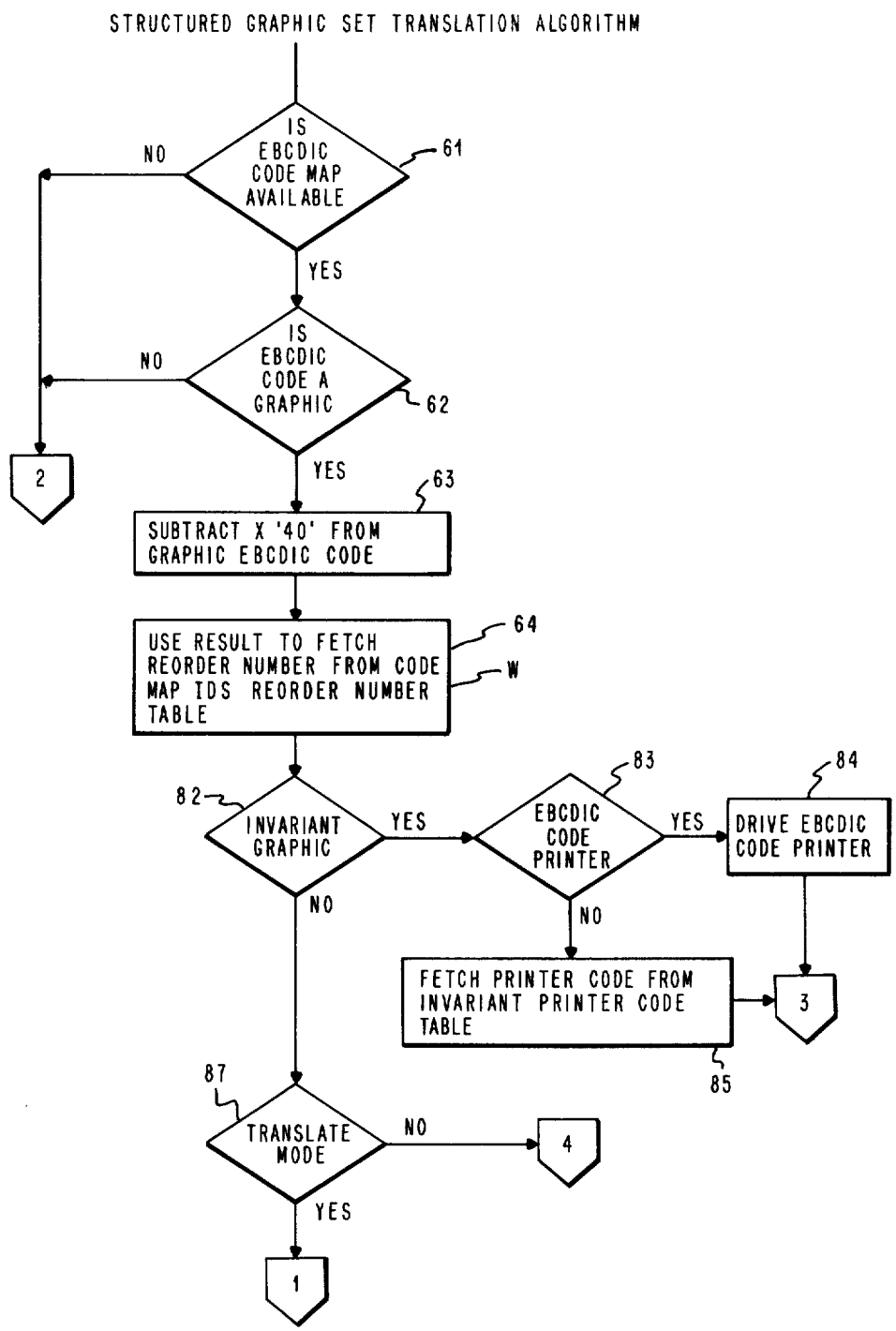

With the above structure in mind, the operations performed by processor 60 under the control of the program or algorithm contained in block 17 of FIG. 2 will be described. These operations are set forth in detail in FIGS. 8-12. Referring first to FIG. 8, logic sequences 61-64 are identical to those illustrated in FIG. 4. If a code map is not available and the character in EBCDIC code applied along line 21 is not a graphic, translation is not possible and the operation is terminated. This is illustrated by logic sequence 81 in FIG. 10.

Following obtaining a reorder number by logic sequence 64, a test is performed by logic sequence 82 to determine if the character falls into an invariant graphic category. If there is a positive result of the test performed in logic sequence 82, a test is performed by logic sequence 83 to determine if the printer in use is an EBCDIC code driven printer. If so, the previously obtained reorder number is used as an ANDing condition for gating the EBCDIC code applied along line 21 to buffer 10 for ultimately driving the printer to print the character. This is indicated by logic sequence 84. If not, logic sequence 85 causes a printer code to be obtained from invariant printer code table 72 in FIG. 7. Upon obtaining the printer code from invariant printer code table 72, logic sequence 86 in FIG. 10 transmits the code to buffer 10.

If the result of the test performed by logic sequence 82 is negative, a test is performed by logic sequence 87 to determine if the character appearing on line 21 exists on the print element on the printer. A point to note here is that a selected print element may support a plurality of keyboards. The variant print element table of FIG. 6 (denoted by reference numeral 37 in FIG. 7) is examined to find a table which supports the active graphic set (keyboard) identification code. This is indicated by logic sequence 88 in FIG. 10. Assuming that the graphic set identification code or keyboard identification code is supported as indicated by logic sequence 89, a search is made to find the character as indicated by logic sequence 90. This operation is a forerunner to the operation of constructing a character.

Figure 11:
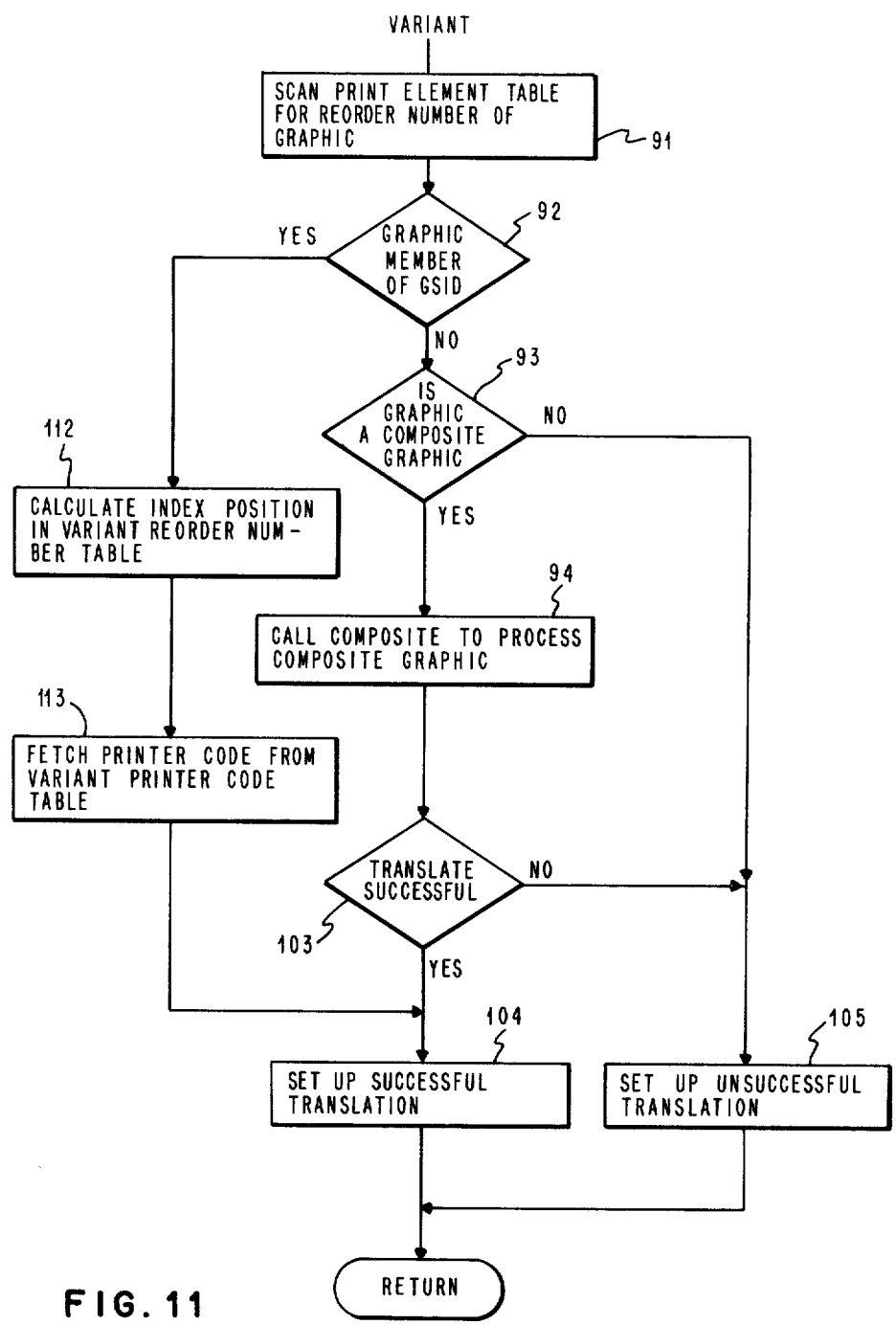
Figure 12:
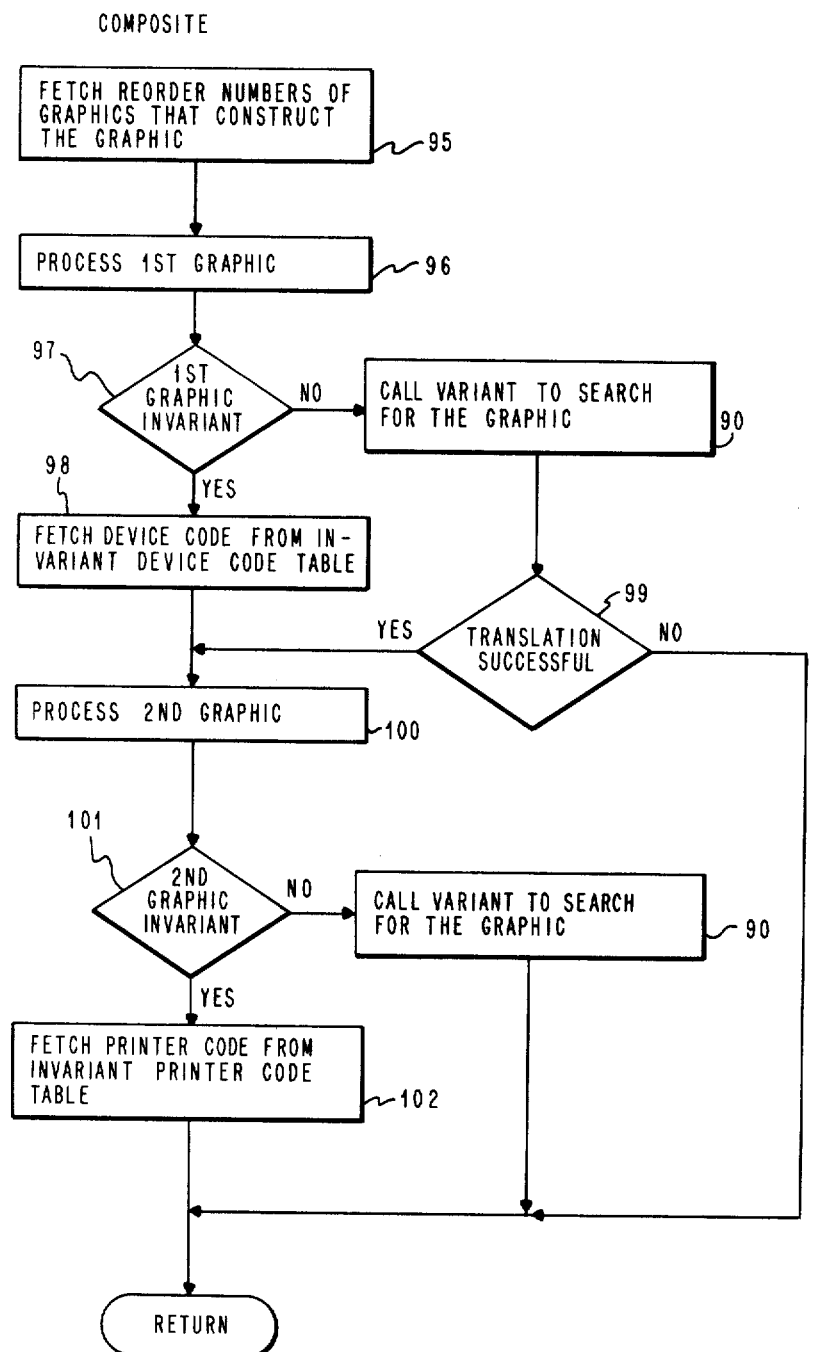

Refer next to FIG. 11. Logic sequence 91 calls for a scanning of the variant reorder numbers in print element tables 73 for a reorder number of the character. A test is made in logic sequence 92 to determine if the reorder number for the character is present. If the character is not found, a determination, as indicated by logic sequence 93, is made as to whether the character falls into a composite category. Logic sequence 94 causes a routing to the composite character operations shown in FIG. 12. In this figure, logic sequence 95 causes the reorder number of graphics that can be used to construct the character to be obtained. The graphic reorder numbers which can be used to construct the character are set out in the composite character table 75 in FIG. 7. Assume for a moment that the reorder number from tables 73 is 190. In this case, the beginning of the composite category 155 is subtracted from 190. The result is 35 which is multiplied by 2 to provide an index of 70. The index of 70 is used as a pointer into the composite character table 75. Located in the composite character table are two side-by-side reorder numbers. Assume that the first for a "ϕ" is 42 and the second is 66. Reorder number 42 is invariant, and therefore, can be translated. In this case, reorder number 42 is used to index invariant printer code table 72. It is to be further assumed that located at the index position in the invariant printer code table 72 is X'59'. X'59' provides the tilt/rotate information for printing with a golf ball type printer. The second reorder number in the composite character table 75 as 66. This is the reorder number of a "/" and falls within a variant category. In this case, the variant print element table 73 is indexed to position 66. The index position of the reorder number in the variant reorder number list of the print element table 73 is then used to index into the variant printer code table 74 to obtain a hexadecimal code for causing the printer to perform the correct tilt/rotate operation. Although alluded to earlier, it is to be specifically pointed out that the hexadecimal codes read out of both the invariant and variant printer code tables are different than the hexadecimal codes read from text storage buffer 8. That is, a "ϕ" is stored in text storage buffer 8 in a binary equivalent to X'80'. Based on the above assumptions, the hexadecimal codes read out of the invariant printer code table are X'59' and X'09', respectively, for causing correct tilt and rotate. In the event a daisy wheel printer is being utilized, the reorder numbers 42 and 66 read out of the composite character table 75 are used respectively as gating terms for gating the appropriate hexadecimal codes to buffer 10.

Referring again to FIG. 12, logic sequence 96 calls for processing the first character. Processing the first character involves a test by logic sequence 97 to determine if the first character read out of the composite character table 75 in FIG. 7 is invariant. If so, the operations described above are repeated.

Logic sequence 98 causes the printer code from the invariant printer code table to be obtained. In the event that the first character in the composite character table 75 is not invariant, the events called of logic sequence 90 are called for. It is to be noted that logic sequence 90 appears both in FIGS. 10 and 12. This results in logic sequence 91 in FIG. 11 being called for.

Thereafter, a test is made in logic sequence 99 to determine if there has been a successful translation operation. If not, the character cannot be constructed with the print element. If there has been a successful translation operation, the second character in the composite character table 75 is processed. This is indicated by logic sequence 100. Processing of the second character first involves a test in logic sequence 101 to determine if the second character is invariant. If not, logic sequence 90 is again called for. If the second character is invariant, logic sequence 102 causes the printer code from the invariant printer code table 74 in FIG. 7 to be sought. If a successful translation has taken place as indicated by the test in logic sequence 103 in FIG. 11, logic sequence 104 causes the system to set up for successful translation and operation is returned to logic sequence 90 in FIG. 10. A successful translation simply means that a reorder number has been found. Following the test in logic sequence 103, if there has not been a successful translation then the operation of logic sequence 105 are performed and operation returns to logic sequence 90 in FIG. 10.

Figure 9:
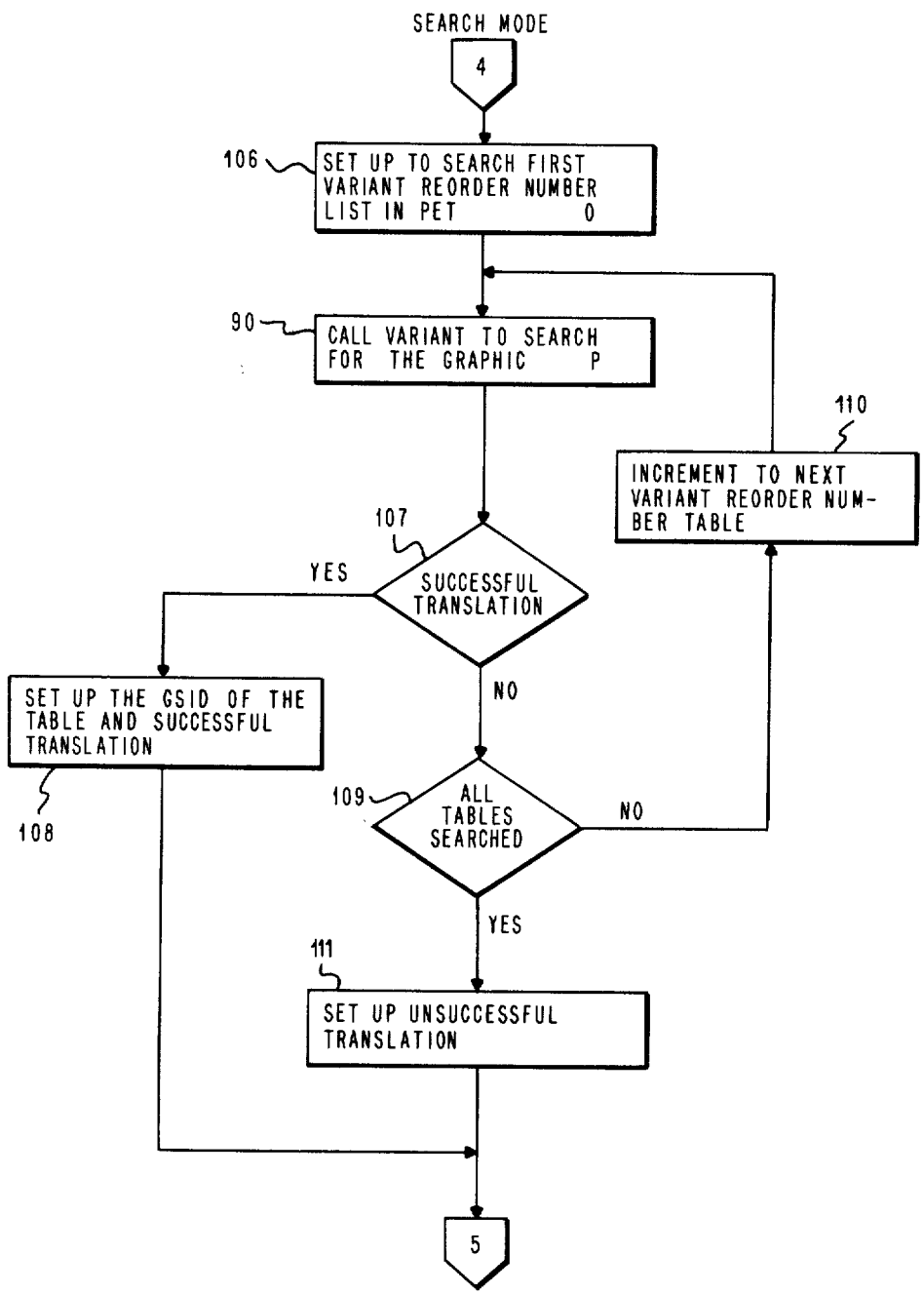

The operations of searching for a reorder number are illustrated in FIG. 9. Logic sequence 106 causes a setup to search for a variant reorder number in print element table 73 in FIG. 7. This results in the operations performed by logic sequence 90 again being performed. If a reorder number has been found as indicated by the test in logic sequence 107 the first graphic set identification (keyboard identification) in the print element table is set up to indicate to the operator the print element to mount to print the character. This operation is indicated by logic sequence 108. In the event a reorder number has not been found by the test indicated in logic sequence 107, a test is performed by logic sequence 109 to determine if all print element tables have been searched. If not, logic sequence 110 causes an incrementing to the next print element table and the operations of logic sequence 90 are again performed. If in the event all tables have been searched, provision is made to handle the circumstances an unsuccessful translation as indicated by logic sequence 111.

Referring again to FIG. 11 and the test indicated by logic sequence 92, if the character is a member of the keyboard identification, the index position in the variant reorder number list of the print element table is calculated as indicated by logic sequence 112. Thereafter, the printer code from the variant printer code table is sought as indicated by logic sequence 113.

Figure 13:
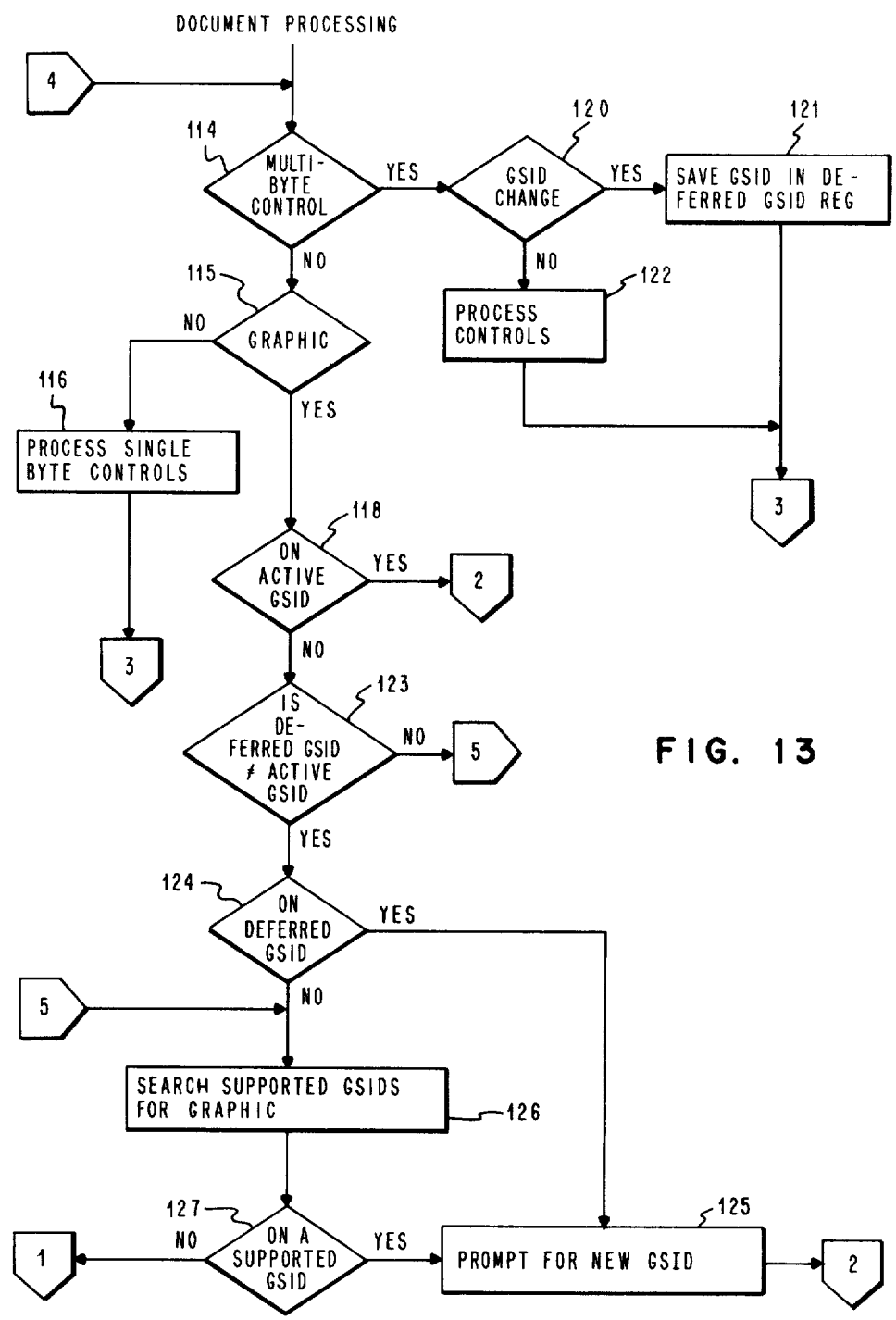
FIGS. 13 and 14 are flow charts illustrating the operations performed by the processor of FIG. 3 in providing for continued printing following the reading of a different keyboard identification code from the text storage buffer of FIG. 2.
Figure 14:
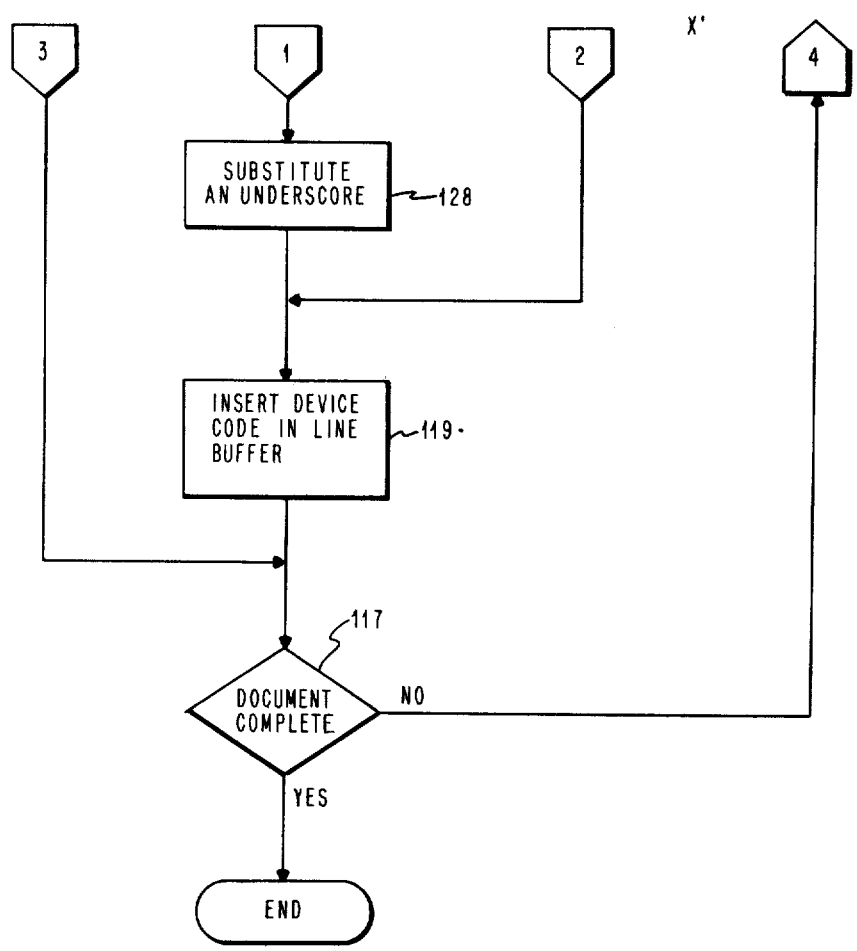

Reference is next made to FIGS. 13 and 14. In these figures are depicted the operations leading to a prompting or signalling of an operator for a print element change in the event a character cannot be printed. As indicated earlier, at the beginning of a document there exist multi-byte control codes. One of these codes is used to denote the keyboard identification. A test is made in logic sequence 114 to determine if the code is a control code. If not, a test is made in logic sequence 115 to determine if the code read along line 21 is a character. If not, any single byte control code or codes are processed as indicated by logic sequence 116. Thereafter, a determination is made by logic sequence 117 in FIG. 14 as to whether the document has been completed. If so, the operation is terminated. If not, the test performed by logic sequence 114 is repeated. If the results of the test in logic sequence 115 are positive, a test is made in logic sequence 118 to determine if the character is supported by the active keyboard. That is, a determination is made as to whether the character exists on the mounted print element. If so, the printer code for printer in use is loaded into line buffer 10 in FIG. 2. This is indicated by logic sequence 119 in FIG. 14.

In the event the results of the test performed by logic sequence 114 are that the multi-byte control read along line 21 is a keyboard identification change (as indicated by logic sequence 120), the keyboard identification code is stored in a deferred keyboard identification code register as indicated by logic sequence 121. Thereafter, a test is made in logic sequence 117 to determine if the document has been completed. If the multi-byte control appearing on line 21 is not a keyboard identification change, the multi-byte control is processed as indicated by logic sequence 122.

Turning to the test performed by logic sequence 118, if the character read along line 21 is not supported by the keyboard, a test is made to determine whether there is a comparison between the active keyboard and the keyboard identification code stored in the deferred keyboard identification code register. This test is performed by logic sequence 123. If the results of the test performed by logic sequence 123 are negative, the character read along line 21 is processed by logic sequence 126. If the results of the test performed by logic sequence 123 are positive, a test is performed by logic sequence 124 to determine if the character exists on the keyboard stored in the deferred keyboard identification register. The register utilized for storing a deferred keyboard identification code can exist either in the processor or in section 6 in FIG. 2. If the results of the test performed by logic sequence 124 are positive, the operator is prompted to install a proper print element. This is indicated by logic sequence 125. Following prompting of the need for a new print element, the appropriate printer code is inserted into line buffer as indicated by logic sequence 119. In the event the character does not exist on a print element identified by a deferred keyboard identification code, a search is made of available keyboards (print element tables) to obtain the particular character. This is represented by logic sequence 126. In the event a keyboard is not available to the system, as indicated by the test performed by logic sequence 127, an underscore code is substituted for the non-processable character as indicated by logic sequence 128. On the other hand, if there is a keyboard available to the system, the operator is prompted to install a proper print element as indicated by logic sequence 125.

The following is both a summary of the more salient features of the above, and includes details not heretofore mentioned.

The print element tables 73 contain a list of reorder numbers that represent the graphics supported by the EBCDIC code maps of Tables 1-3. These are the characters available to the system. Each unique graphic on the code maps supported by the machine is represented by a unique reorder number ranging from 0-255. The print element tables are 192 bytes in length. Each contains the reorder numbers of the graphics that make up the code map graphic set. The reorder number for a graphic is placed in the table location that corresponds to the EBCDIC code minus X'40'. As pointed out earlier, a lower case "a" is represented as X'81', and its reorder number of 41 is in position 65 in all print element tables. As such, this character is invariant.

The print element tables are an integral part of the translation operations. Obtaining a reorder number determines the character category. If the category is invariant, the reorder number is added to the top of the invariant printer code table and the contents of that location are the printer code that is to be output to the printer for that graphic. If the category is variant, the use of additional tables is required. The composite character table contains two reorder numbers per constructable graphic. The reorder numbers are the reorder numbers of the two graphics that can be used to construct the character read from buffer 8. The table contains the reorder number of the overstruck graphic in the first position and the reorder number of the overstriking graphic in the second position. The reorder number that begins the composite graphics is subtracted from the reorder number of the composite graphic. The result is multiplied by two to obtain the location of the two reorder numbers that are used to construct the graphic.

The IPCT length byte in FIG. 5 is used to determine if the printer code type is something other than EBCDIC. If this byte contains a zero, the EBCDIC code is used to determine the printer code for the graphic.

The invariant printer code table 72 contains the printer specific codes that represent the characters that are on all print elements and have the same code on all print elements for a particular printer. The alphabetics, numerics and some special characters such as period, comma, slash, etc., will cause invariant printer code table 72 to be indexed from table 71. The size of table 72 will vary dependent on the printer. The contents of table 7 will be tilt-rotate codes for a golf ball type printer. Table 72 is not required for EBCDIC driven printers.

The variant printer code table 74 contains the printer specific codes that represent the characters that are not on all print elements or have different codes or various print elements for a particular represent variant graphics will cause table 71 to index tables 73 for translation operations. The position of the reorder number in tables 73 will be used as an index into this table to obtain the code that should be sent to the printer (buffer 10) for the graphic. The size of table 73 will vary dependent on the printer. The contents of table 73 will be tilt-rotate codes. Table 74 is not needed by an EBCDIC driven printer.

Tables 73 contain the variant reorder numbers of those graphics that exist on the print element. When a variant character is to be translated, the keyboard identification codes in Table 73 are requested for the active keyboard to determine if a print element table exists for the keyboard.

If the keyboard identification code is found, tables 73 are used to determine if the graphic is on the element. The reorder number of the graphic is searched for in tables 73. If the reorder number is found, a successful translation has occurred in that a proper printer code is available. If the keyboard identification code or reorder number are not found, an unsuccessful translation has occurred. In this case, all of the tables 73 are searched to determine if the graphic can be supported (printed).

The reorder numbers are ordered in tables 73 according to the position of the code that should be output for the graphic in table 74. The code that is to be output for a graphic will vary dependent on the print element in use. Therefore, each one of tables 73 is customized for a print element. The position where the reorder number is found is used as an index into table 74 to determine the graphic printer code. The length of the tables will vary dependent on the printer in use.

If the reorder number is not found in the active one of tables 73, a determination is made as to whether the graphic can be constructed. Reorder numbers 155-255 represent those graphics that can be constructed. If the graphic can be constructed, the reorder number is used to index into table 75 to obtain the two reorder numbers representing the graphics that can be used to construct the called for graphic. If these two reorder numbers are either invariant or variant and found in the active one of tables 73, the variant reorder number is used to index into table 72 and the index position of the variant graphic(s) is used to obtain the printer code(s) that are to be output to the printer. If the variant reorder numbers from the composite table cannot be found in the active one of tables 73, another one of tables 73 is searched for the graphic.

Figure 15:
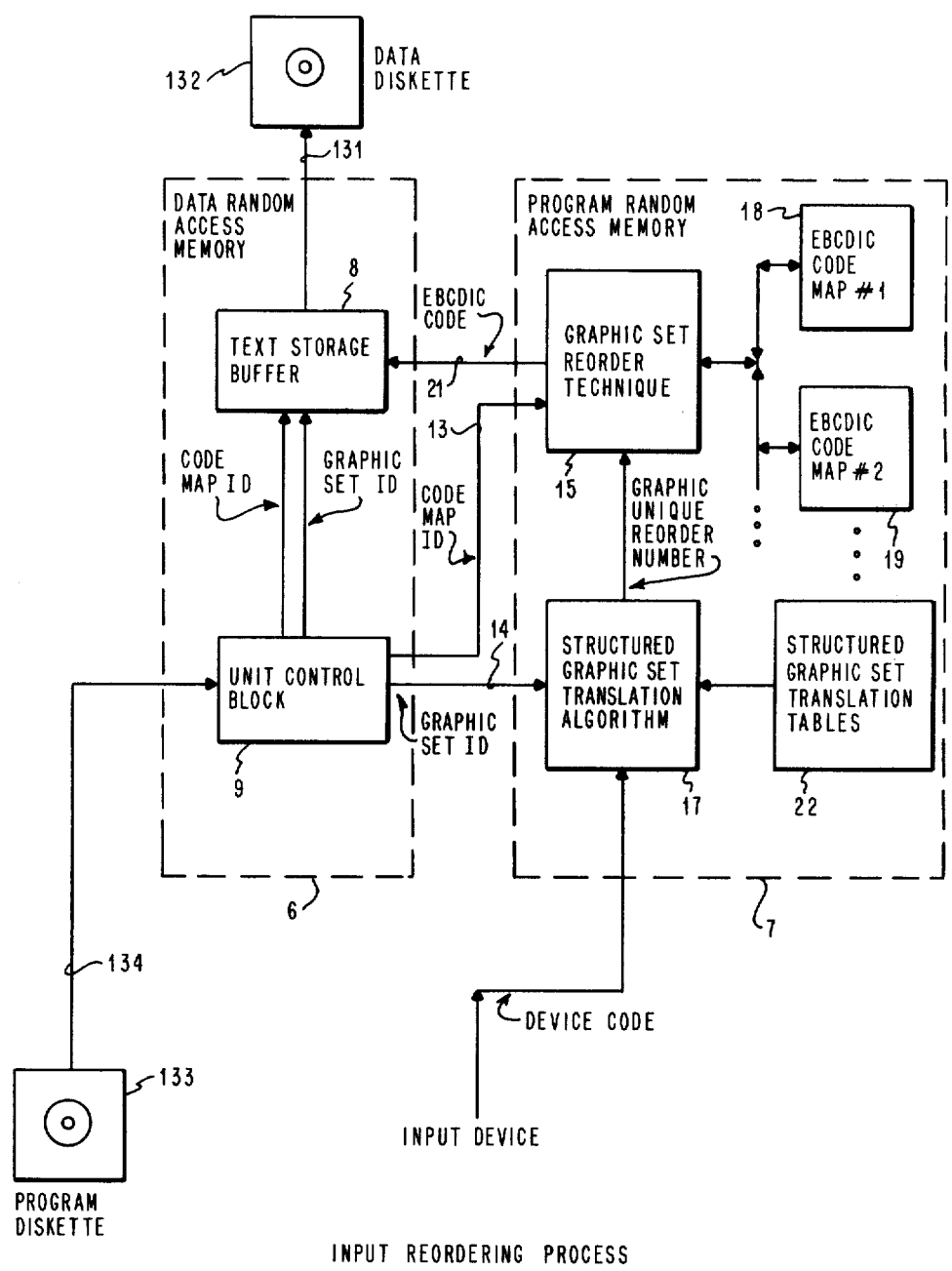
FIG. 15 is similar to FIG. 2, but illustrates the handling of incoming text from an external source.

Refer next to FIG. 15. The structure included in this figure is similar to that shown in FIG. 2. The primary distinctions are an input line 130 to translation algorithm 17, and an output line 131 to a floppy disk storage device 132. For this figure, it is to be assumed that incoming data is applied along line 130 from a communication device. The object therefore, is to convert the communication device code to EBCDIC for storage in text buffer 8 and ultimate transfer along line 131 to floppy disk storage device 132. Since the operations performed are obvious in view of the above description, they will only be briefly described below.

The incoming device code is first applied to translation algorithm block 17, and a reorder number is sought for converting to an EBCDIC code for storage in buffer 8. It is to be noted that the algorithm of blocks 15 and 17 will be slightly altered, but in a straightforward manner. The algorithms are first applied from program diskette 133 along line 134 to control block 9. In block 9, the algorithms are available to processor 60 on an as needed basis.

In summary, both a method of, and system for, efficiently managing print element changes are provided in that both character availability and character construction are looked to before alerting an operator of a print element change requirement.

The characters making up the various keyboards available to the system are mapped in a minimum number of keyboard code maps. Existing in various of the maps are characters which are identically coded. In other instances, different coding represents different characters in different maps. Once a keyboard has been selected, the system will select an appropriate keyboard code map to distinguish coding during input keying. Both selections are stored in a buffer such that a keyboard code map identification code and a keyboard identification code properly identify following text codes. Assuming that at a particular point in time printing is from the buffer and the print element in use matches the last read keyboard identification code. Each character code read is reordered to determine whether it falls within either an invariant, variant, or composite character category. Regardless, reading causes a printing of the corresponding character. For a character read following a subsequent different keyboard identification code, the category can become important. If invariant, reordering causes a printing as before. If the character falls within a variant category and exists on the element, a translation operation is necessary. This is to correct for the code read not matching the desired character position on the element. If the character is not available on the element and is not a composite character, a change requirement is signalled. If the character falls within a composite category, and the characters required to construct the composite character are available, category determinations are made to determine whether printing will occur from reordering and/or a translation operations. Regardless, printing is caused to occur. If the character cannot be constructed due to the absence of a required character on the print element, a change requirement is signalled.

In accordance with the above, once a print element is in use, printing can continue beyond normal print element limitations, and keyboard coding changes no longer automatically require a change in print elements.

While the invention has been particularly shown and described with reference to a particular embodiment, it will be understood by those skilled in the art that various changes in form and detail may be made without departing from the spirit and scope of the invention.

What is claimed is:

1. A system for reducing the number of print element changes normally required by a printer in printing characters from different character sets, said system comprising:
   (a) means for determining whether a character to be printed is included on a print element on said printer;
   (b) means, if said character to be printed is not included on said print element on said printer, for determining if said character to be printed can be constructed by printing a plurality of characters included on said print element on said printer; and
   (c) means for causing printing of said character to be printed if either said character (1) is included on said print element on said printer, or (2) can be constructed from said plurality of characters on said print element on said printer.

2. A system according to claim 1 including means for signalling a requirement for a print element change only if said character to be printed is not included on said print element on said printer and said character to be printed cannot be constructed from said plurality of said characters included on said print element on said printer.

3. A method of reducing the number of print element changes necessary in printing text made up of characters from different character sets, said method comprising:
   (a) determining whether a character to be printed is included on a print element on a printer being used;
   (b) determining, if said character to be printed is not included on said print element on said printer, whether said character to be printed can be constructed from a number of characters included on said print element on said printer; and
   (c) causing a printing of said character to be printed if said character to be printed is either included on said print element on said printer or can be constructed by printing a number of characters included on said print element on said printer.

4. A method according to claim 3 including signalling a requirement for a print element change only if said character to be printed is not included on said print element on said printer and said character to be printed cannot be constructed from a number of characters included on said print element on said printer.

5. A method according to claim 3 including ordering characters in a character set based on a frequency of use basis.

6. A method according to claim 5 including categorizing said characters included in said character set into invariant, variant, and composite categories based on said ordering of said characters.

7. A method according to claim 6 including determining one of said categories for a character to be printed.

8. A method according to claim 7 including determining whether a translation operation is to be performed to provide a code to a printer being used to effect printing of a character keyed.

* * * * *